US012424178B2

(12) United States Patent
Kim et al.

(10) Patent No.: US 12,424,178 B2
(45) Date of Patent: Sep. 23, 2025

(54) DISPLAY DEVICE

(71) Applicants: LG Display Co., Ltd., Seoul (KR); Industry-University Cooperation Foundation Hanyang University, Seoul (KR)

(72) Inventors: Harkjin Kim, Incheon (KR); Kwanghwan Ji, Incheon (KR); Byong-Deok Choi, Seoul (KR); Bum Sik Kim, Suwon-si (KR); Dong Young Kim, Paju-si (KR); Yong Duck Kim, Seoul (KR); June Hee Lee, Paju-si (KR)

(73) Assignees: LG Display Co., Ltd., Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 18/242,926

(22) Filed: Sep. 6, 2023

(65) Prior Publication Data

US 2024/0087538 A1 Mar. 14, 2024

(30) Foreign Application Priority Data

Sep. 7, 2022 (KR) ........................ 10-2022-0113725

(51) Int. Cl.
*G09G 3/3283* (2016.01)

(52) U.S. Cl.
CPC ....... *G09G 3/3283* (2013.01); *G09G 2320/02* (2013.01); *G09G 2330/021* (2013.01)

(58) Field of Classification Search
CPC .. G09G 3/3233; G09G 3/3266; G09G 3/3283; G09G 2310/0202;
(Continued)

(56) References Cited

U.S. PATENT DOCUMENTS

2011/0122124 A1* 5/2011 Kimura ................ G09G 3/3266 345/214
2015/0108465 A1* 4/2015 Koyama ............. H01L 27/1214 257/40

(Continued)

FOREIGN PATENT DOCUMENTS

JP 2020-204327 * 12/2020 ............... G09G 3/20
KR 10-2017-0026758 A 3/2017

*Primary Examiner* — Amr A Awad
*Assistant Examiner* — Aaron Midkiff
(74) *Attorney, Agent, or Firm* — Morgan, Lewis & Bockius LLP

(57) ABSTRACT

A display device according to an exemplary embodiment of the present disclosure includes a light emitting diode and a pixel driving circuit which drives the light emitting diode, the pixel driving circuit includes a driving transistor which applies a driving current to the light emitting diode, a first transistor which applies a first reference voltage to a gate electrode of the driving transistor, a second transistor which applies a data voltage to the gate electrode of the driving transistor, a third transistor which applies a second reference voltage to a source electrode of the driving transistor, and a storage capacitor connected to the gate electrode and the source electrode of the driving transistor. According to the present disclosure, the threshold voltage Vth and the mobility of the driving transistors are internally compensated to improve an image quality.

11 Claims, 44 Drawing Sheets

PX

(58) Field of Classification Search
CPC ... G09G 2300/0426; G09G 2300/0819; G09G 2300/0842; G09G 2320/02; G09G 2320/0233; G09G 2320/043; G09G 2320/045; G09G 2330/021; G09G 2300/0809; G09G 2310/0251; G09G 3/3258; G09G 2300/0861; G09G 2310/061; H01L 29/78645; H01L 29/48
See application file for complete search history.

(56) References Cited

U.S. PATENT DOCUMENTS

| | | | | |
|---|---|---|---|---|
| 2017/0061866 | A1 | 3/2017 | In et al. | |
| 2018/0330670 | A1* | 11/2018 | Han | G09G 3/3233 |
| 2019/0114960 | A1* | 4/2019 | Lee | G09G 3/3225 |
| 2019/0164481 | A1* | 5/2019 | Yuan | H10K 59/1216 |
| 2021/0287604 | A1* | 9/2021 | Xue | G09G 3/3258 |
| 2021/0335243 | A1* | 10/2021 | Ohara | G09G 3/3266 |
| 2022/0284860 | A1* | 9/2022 | Lin | G09G 3/3266 |
| 2024/0112631 | A1* | 4/2024 | Toyomura | H10K 59/12 |

* cited by examiner

DISPLAY DEVICE

CROSS-REFERENCE TO RELATED APPLICATIONS

This application claims the priority of Korean Patent Application No. 10-2022-0113725 filed on Sep. 7, 2022, in the Korean Intellectual Property Office, the disclosure of which is incorporated herein by reference.

BACKGROUND

Technical Field

The present disclosure relates to a display device, and more particularly, to a display device which is capable of responding a characteristic change by the compensation while minimizing an area of a pixel driving circuit.

Discussion of the Related Art

As display devices which are used for a monitor of a computer, a television, a cellular phone, or the like, there are an organic light emitting display (OLED) device which is a self-emitting device, a liquid crystal display (LCD) device which requires a separate light source, and the like.

An organic light emitting diode used for an organic light emitting display device, among the display devices as described above, is a self-emitting element which emits by itself and has a high luminance and a low operating voltage characteristic. Accordingly, the organic light emitting display device has a high contrast ratio and is easily implemented with an ultra-thin thickness. Further, a response time is very short so that there is no afterimage and no restriction in a viewing angle. Further, the organic light emitting display device is stably driven even at a low temperature.

The organic light emitting display device includes a plurality of pixels and in each pixel, an organic light emitting diode and a pizel driving circuit for driving the organic light emitting diode are disposed.

SUMMARY

Accordingly, embodiments of the present disclosure are directed to a display device that substantially obviates one or more of the problems due to limitations and disadvantages of the related art.

An aspect of the present disclosure is to provide a display device which compensates for a threshold voltage Vth and mobility to improve an image quality.

Another aspect of the present disclosure is to provide a display device which is capable of minimizing an area of a pixel driving circuit.

Still another aspect of the present disclosure is to provide a display device which is capable of reducing power consumption.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a light emitting diode and a pixel driving circuit which drives the light emitting diode, wherein the pixel driving circuit includes a driving transistor which applies a driving current to the light emitting diode, a first transistor which applies a first reference voltage to a gate electrode of the driving transistor, a second transistor which applies a data voltage to the gate electrode of the driving transistor, a third transistor which applies a second reference voltage to a source electrode of the driving transistor and a storage capacitor connected to the gate electrode and the source electrode of the driving transistor.

Other detailed matters of the exemplary embodiments are included in the detailed description and the drawings.

According to the present disclosure, the threshold voltage Vth and the mobility of the driving transistors are internally compensated to improve an image quality.

According to the present disclosure, the number of transistors and storage capacitors included in a pixel driving circuit is minimized and the number of wiring lines connected to the pixel driving circuit is minimized to minimize areas of the pixel driving circuit and the wiring line.

According to the present disclosure, a data line and a reference voltage line of the display device are separately designed to reduce the power consumption.

According to the present disclosure, a scan signal is simplified to minimize a configuration of a gate driver.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings:

FIGS. 15A and 158 are a circuit diagram and a timing chart for explaining the driving of a pixel driving circuit of a display device according to still another exemplary embodiment of the present disclosure;

DETAILED DESCRIPTION

Figure 1:
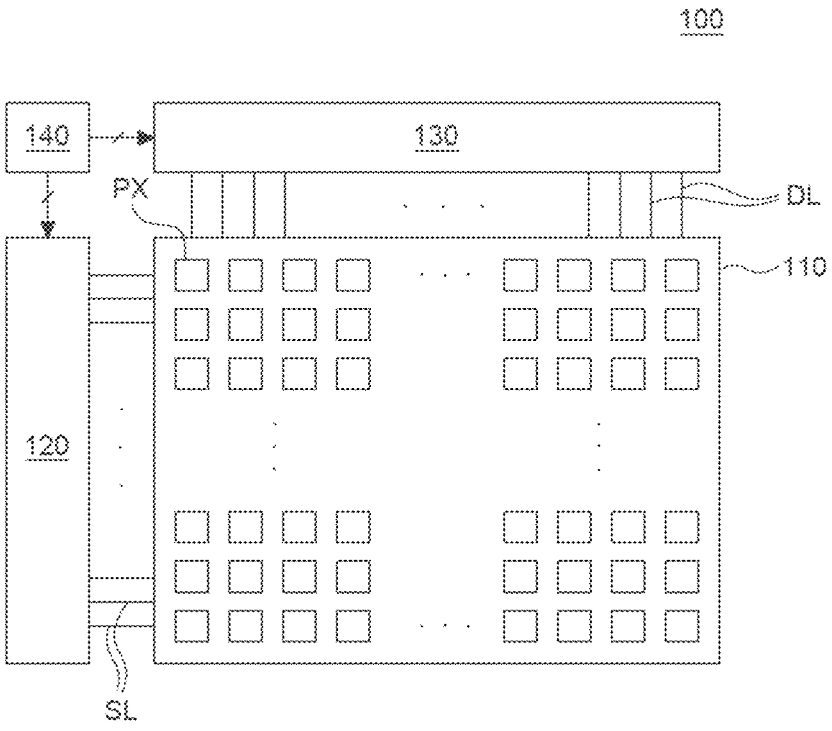
FIG. 1 is a block diagram schematically illustrating a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “consist of” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When an element or layer is disposed “on” another element or layer, another layer or another element may be interposed directly on the other element or therebetween.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

A transistor used for a display device of the present disclosure may be implemented by one or more transistors among n-channel transistors (NMOS) and p-channel transistors (PMOS). The transistor may be implemented by an oxide semiconductor transistor having an oxide semiconductor as an active layer or an LTPS transistor having a low temperature poly-silicon (LTPS) as an active layer. The transistor may include at least a gate electrode, a source electrode, and a drain electrode. The transistor may be implemented as a thin film transistor on a display panel. In the transistor, carriers flow from the source electrode to the drain electrode. In the case of the n-channel transistor NMOS, since the carriers are electrons, in order to allow the electrons to flow from the source electrode to the drain electrode, a source voltage may be lower than a drain voltage. The current in the n-channel transistor NMOS flows from the drain electrode to the source electrode and the source electrode may serve as an output terminal. In the case of the p-channel transistor PMOS, since the carriers are holes, in order to allow the holes to flow from the source electrode to the drain electrode, a source voltage is higher than a drain voltage. In the p-channel transistor PMOS, the holes flow from the source electrode to the drain electrode so that current flows from the source to the drain and the drain electrode serves as an output terminal. Accordingly, the source and the drain may be switched in accordance with the applied voltage so that it should be noted that the source and the drain of the transistor are not fixed. In the present specification, it is assumed that the transistor is an n-channel transistor NMOS, but is not limited thereto so that the p-channel transistor may be used and thus a circuit configuration may be changed.

Gate signals of transistors which are used as switching elements swing between a gate on voltage and a gate off voltage. The gate on voltage is set to be higher than a threshold voltage Vth of the transistor and the gate off voltage is set to be lower than the threshold voltage Vth of the transistor. The transistor is turned on in response to the gate on voltage and is turned off in response to the gate off voltage. In the case of the NMOS, the gate on voltage may be a gate high voltage VGH and the gate off voltage may be a gate low voltage VGL. In the case of the PMOS, the gate on voltage may be a gate low voltage VGL and the gate off voltage may be a gate high voltage VGH.

Hereinafter, various exemplary embodiments of the present disclosure will be described in detail with reference to accompanying drawings.

FIG. 1 is a block diagram illustrating a display device according to an exemplary embodiment of the present disclosure.

Referring to FIG. 1, a display device 100 according to the exemplary embodiment of the present disclosure includes a display panel 110, a gate driver 120, a data driver 130, and a timing controller 140.

The display panel 110 is a panel for displaying images. The display panel 110 may include various circuits, wiring lines, and light emitting diodes disposed on the substrate. The display panel 110 is divided by a plurality of data lines DL and a plurality of scan lines SL intersecting each other and may include a plurality of pixels PX connected to the plurality of data lines DL and the plurality of scan lines SL. The display panel 110 may include a display area defined by a plurality of pixels PX and a non-display area in which various signal lines or pads are formed. The display panel 110 may be implemented by a display panel 110 used in various display devices such as a liquid crystal display device, an organic light emitting display device, an electrophoretic display device, an LED display device, and a quantum dot display device. Hereinafter, it is described that the display panel 110 is a panel used for the organic light emitting display device, but is not limited thereto.

The timing controller 140 receives timing signals such as a vertical synchronization signal, a horizontal synchronization signal, a data enable signal, or a dot clock by means of a receiving circuit such as an LVDS or TMDS interface connected to a host system. The timing controller 140 generates timing control signals based on the input timing signal to control the data driver 130 and the gate driver 120.

The data driver 130 supplies the data voltage VDATA to the plurality of pixels PX. The data driver 130 may include a plurality of source drive ICs (integrated circuits). The plurality of source drive ICs may be supplied with digital video data and a source timing control signal from the timing controller 140. The plurality of source drive ICs converts digital video data into a gamma voltage in response to the source timing control signal to generate a data voltage VDATA and supply the data voltage VDATA through the data line DL of the display panel 110. The plurality of source drive ICs may be connected to the data line DL of the display panel 110 by a chip on glass (COG) process or a tape automated bonding (TAB) process. Further, source drive ICs are formed on the display panel 110 or are formed on a separate printed circuit board PCB substrate to be connected to the display panel 110.

The gate driver 120 supplies the scan signal to the plurality of pixels PX. The gate driver 120 may include a level shifter and a shift register. The level shifter shifts a level of a clock signal input at a transistor-transistor-logic (TTL) level from the timing controller 140 and then may supply the clock signal to the shift register. The shift register may be formed in the non-display area of the display panel 110, by a gate driver in panel (GIP) manner, but is not limited thereto. The shift register may be configured by a plurality of stages which shifts the scan signal to output, in response to the clock signal and the driving signal. The plurality of stages included in the shift register may sequentially output the scan signal through a plurality of output terminals.

Hereinafter, a pixel driving circuit for driving one pixel PX will be described in more detail with reference to FIG. 2 together.

Figure 2:
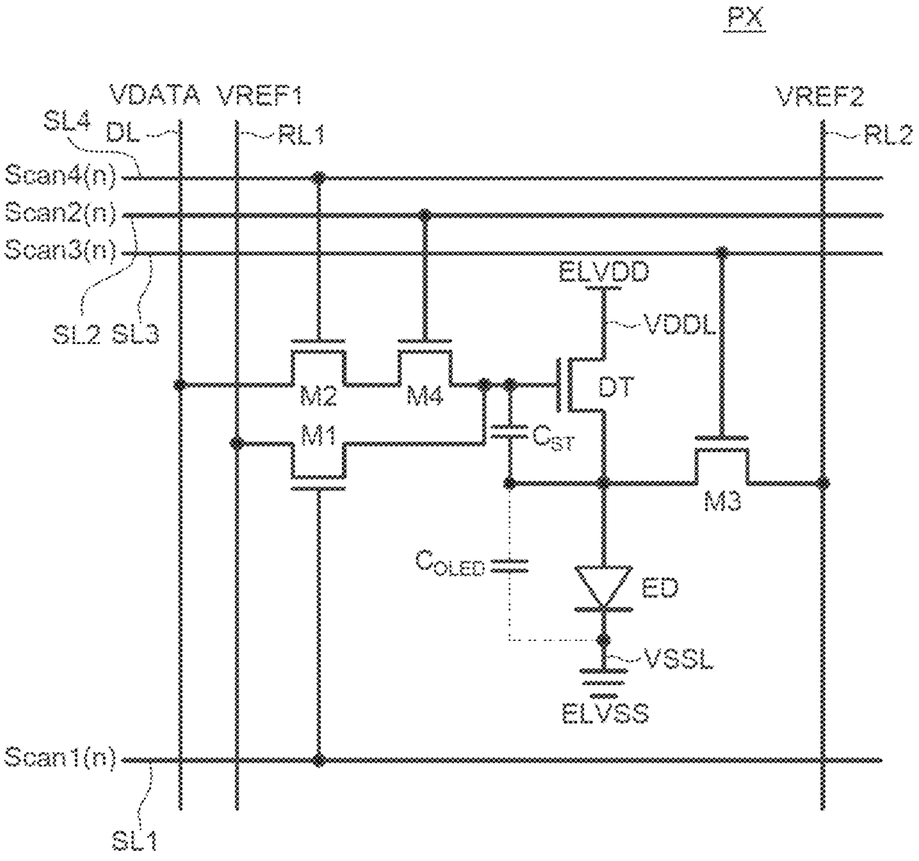
FIG. 2 is a circuit diagram illustrating a pixel driving circuit of a pixel of a display device according to an exemplary embodiment of the present disclosure.

FIG. 2 is a circuit diagram illustrating a pixel driving circuit of a pixel of a display device according to an exemplary embodiment of the present disclosure. In FIG. 2, a pixel driving circuit of a pixel PX disposed in an n-th row in the display panel 110 is illustrated.

Referring to FIG. 2, the pixel PX includes a light emitting diode ED and a pixel driving circuit which drives the light emitting diode ED.

The light emitting diode ED may include an anode, an organic layer, and a cathode. The organic layer may include various organic layers such as a hole injection layer, a hole transport layer, an organic light emitting layer, an electron transport layer, and an electron injection layer. The anode of the light emitting diode ED may be connected to the output terminal of the driving transistor DT and the cathode may be connected to a low potential voltage line VSSL to which a low potential voltage ELVSS is applied. Even though in FIG. 2, it is described that the light emitting diode ED is an organic light emitting diode OLED, the present disclosure is not limited thereto so that as the light emitting diode ED, an inorganic light emitting diode, that is, an LED may also be used.

The pixel driving circuit includes a driving transistor DT, a storage capacitor $C_{ST}$, a first transistor M1, a second transistor M2, a third transistor M3, and a fourth transistor M4. Therefore, the pixel driving circuit is a "5T1C" circuit including five transistors and one storage capacitor.

The driving transistor DT applies a driving current to the light emitting diode ED. The driving transistor DT includes a gate electrode connected to the source electrode of the fourth transistor M4, a drain electrode connected to the high potential voltage line VDDL, and a source electrode connected to an anode of the light emitting diode ED. The driving transistor DT applies a driving current to the light emitting diode ED in response to a voltage applied to the gate electrode.

The first transistor M1 transmits a first reference voltage VREF1 to the gate electrode of the driving transistor DT. The first reference voltage VREF1 is a voltage for initializing a gate electrode of the driving transistor DT. The first transistor M1 is controlled by the first scan signal Scan1(*n*) and is connected between the first reference voltage line RL1 which supplies the first reference voltage VREF1 and the gate electrode of the driving transistor DT. Specifically, a gate electrode of the first transistor M1 may be connected to a first scan line SL1 which supplies a first scan signal Scan1(*n*) and a drain electrode of the first transistor M1 may be connected to a first reference voltage line RL1 which supplies the first reference voltage VREF1. A source electrode of the first transistor M1 may be connected to the gate electrode of the driving transistor DT and a source electrode of the fourth transistor M4. Therefore, the first transistor M1 is turned on by the first scan signal Scan1(*n*) to apply the first reference voltage VREF1 to the gate electrode of the driving transistor DT.

The second transistor M2 transmits the data voltage VDATA to the gate electrode of the driving transistor DT. Specifically, the second transistor M2 may transmit the data voltage VDATA to the gate electrode of the driving transistor DT through the fourth transistor M4. The second transistor M2 is controlled by the fourth scan signal Scan4(*n*) and is connected between the data line DL which supplies the data voltage VDATA and the fourth transistor M4. Specifically, a gate electrode of the second transistor M2 is connected to a fourth scan line SL4 which supplies a fourth scan signal Scan4(*n*), a drain electrode of the second transistor M2 may be connected to the data line DL which supplies the data voltage VDATA, and a source electrode of the second transistor M2 may be connected to the drain electrode of the fourth transistor M4. Therefore, the second transistor M2 is turned on by the fourth scan signal Scan4($n$) to transmit the date voltage VDATA to the gate electrode of the driving transistor DT through the fourth transistor M4.

The third transistor M3 transmits a second reference voltage VREF2 to the source electrode of the driving transistor DT. Further, the third transistor M3 may transmit the second reference voltage VREF2 to the anode of the light emitting diode ED. Therefore, the second reference voltage VREF2 may be used as a voltage for initializing the anode of the light emitting diode ED. The third transistor M3 is controlled by the third scan signal Scan3($n$) and is connected between the second reference voltage line RL2 which supplies the second reference voltage VREF2 and the source electrode of the driving transistor DT. Specifically, a gate electrode of the third transistor M3 is connected to a third scan line SL3 which supplies a third scan signal Scan3($n$) and a drain electrode of the third transistor M3 is connected to a second reference voltage line RL2 which supplies the second reference voltage VREF2. A source electrode of the third transistor M3 is connected to the source electrode of the driving transistor DT and the anode of the light emitting diode ED. Therefore, the third transistor M3 is turned on by the third scan signal Scan3($n$) to apply the second reference voltage VREF2 to the source electrode of the driving transistor DT and the anode of the light emitting diode ED. Further, the third transistor M3 is a transistor for effectively controlling a voltage state of the source electrode of the driving transistor DT and may be utilized as one of voltage sensing paths for the source electrode of the driving transistor DT.

The fourth transistor M4 is connected between the second transistor M2 and the driving transistor DT to transmit the data voltage VDATA to the gate electrode of the driving transistor DT. The fourth transistor M4 is controlled by the second scan signal Scan2($n$) and is connected between the second transistor M2 and the gate electrode of the driving transistor DT. Specifically, the gate electrode of the fourth transistor M4 may be connected to the second scan line SL2 which supplies the second scan signal Scan2($n$) and the drain electrode of the fourth transistor M4 may be connected to the source electrode of the second transistor M2, and the source electrode of the fourth transistor M4 may be connected to the gate electrode of the driving transistor DT. Therefore, the fourth transistor M4 is turned on by the second scan signal Scan2($n$) to apply the data voltage VDATA to the gate electrode of the driving transistor DT.

One electrode of the storage capacitor $C_{ST}$ is connected to the gate electrode of the driving transistor DT and the other electrode is connected to the source electrode of the driving transistor DT. The storage capacitor $C_{ST}$ may maintain a voltage of the gate electrode of the driving transistor DT and the source electrode of the driving transistor DT for one frame.

The driving transistor DT, the first transistor M1, the second transistor M2, the third transistor M3, and the fourth transistor M4 of the display device according to the exemplary embodiment of the present disclosure may be implemented by n-channel transistors NMOS and may be oxide semiconductor transistors which nave oxide semiconductors as active layers. However, it is not limited thereto, and as described above, the transistors may be implemented by p-channel transistors PMOS and may be implemented as LTPS transistors having a low temperature poly-silicon (LTPS) as active layers.

Figure 3:
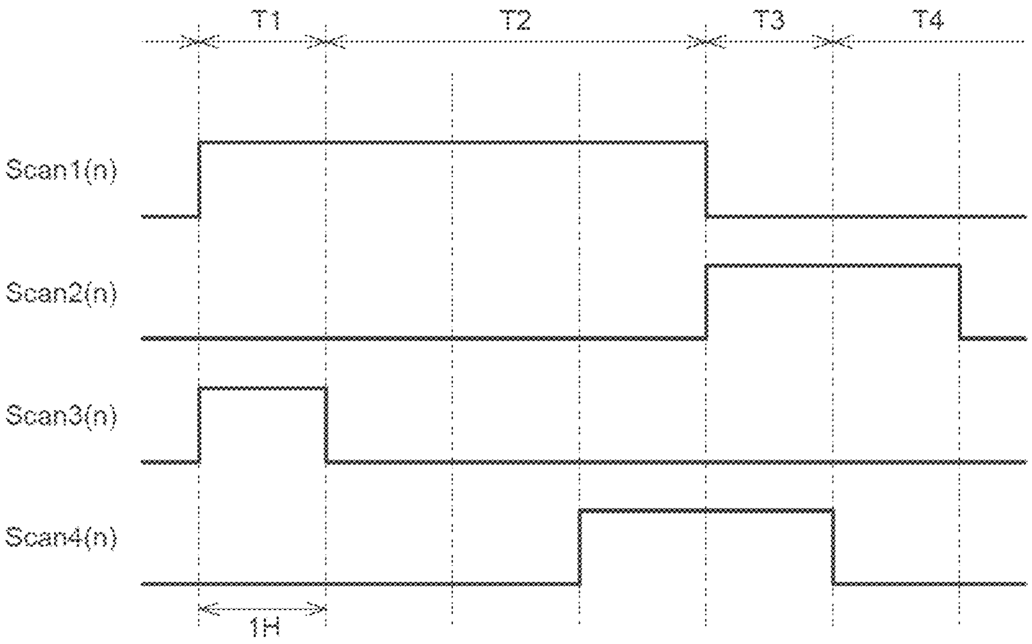
FIG. 3 is a timing chart for explaining the driving of a pixel driving circuit of a display device according to an exemplary embodiment of the present disclosure.

FIG. 3 is a timing chart for explaining the driving of a pixel driving circuit of a display device according to an exemplary embodiment of the present disclosure. FIG. 3 is a timing chart of a first scan signal, a second scan signal, a third scan signal, and a fourth scan signal.

Referring to FIG. 3, the pixel driving circuit is driven by a first period T1, a second period T2, a third period T3, and a fourth period T4.

The first period T1 in which the light emitting diode ED and the driving transistor DT are initialized is one horizontal period (1H). During the first period T1, the first scan signal Scan1($n$) and the third scan signal Scan3($n$) are applied as gate on voltages and the second scan signal Scan2($n$) and the fourth scan signal Scan4($n$) are applied as gate off voltages.

Next, the second period T2 in which the threshold voltage of the driving transistor DT is sensed may be three horizontal periods (3H). During the second period T2, the first scan signal Scan1($n$) is applied as a gate on voltage and the fourth scan signal Scan4($n$) is applied as the gate on voltage only during the last one horizontal period 1H and the second scan signal Scan2($n$) and the third scan signal Scan3($n$) are applied as gate off voltages.

Next, a third period T3 in which the data voltage VDATA is input and a mobility of the driving transistor DT is sensed may be one horizontal period 1H. During the third period T3, the second scan signal Scan2($n$) and the fourth scan signal Scan4($n$) are applied as gate on voltages and the first scan signal Scan1($n$) and the third scan signal Scan3($n$) are applied as a gate off voltage.

Next, the fourth period T4 in which the light emitting diode ED emits light is continued. During only one horizontal period 1H in the fourth period T4, the second scan signal Scan2($n$) is applied as a gate on voltage and the first scan signal Scan1($n$), the third scan signal Scan3($n$), and the fourth scan signal Scan4($n$) are applied as gate off voltages.

Hereinafter, the specific driving of a pixel driving circuit which is disposed in one pixel of a display device according to the exemplary embodiment of the present disclosure will be described in detail with reference to FIGS. 4A to 4H.

Figure 4A:
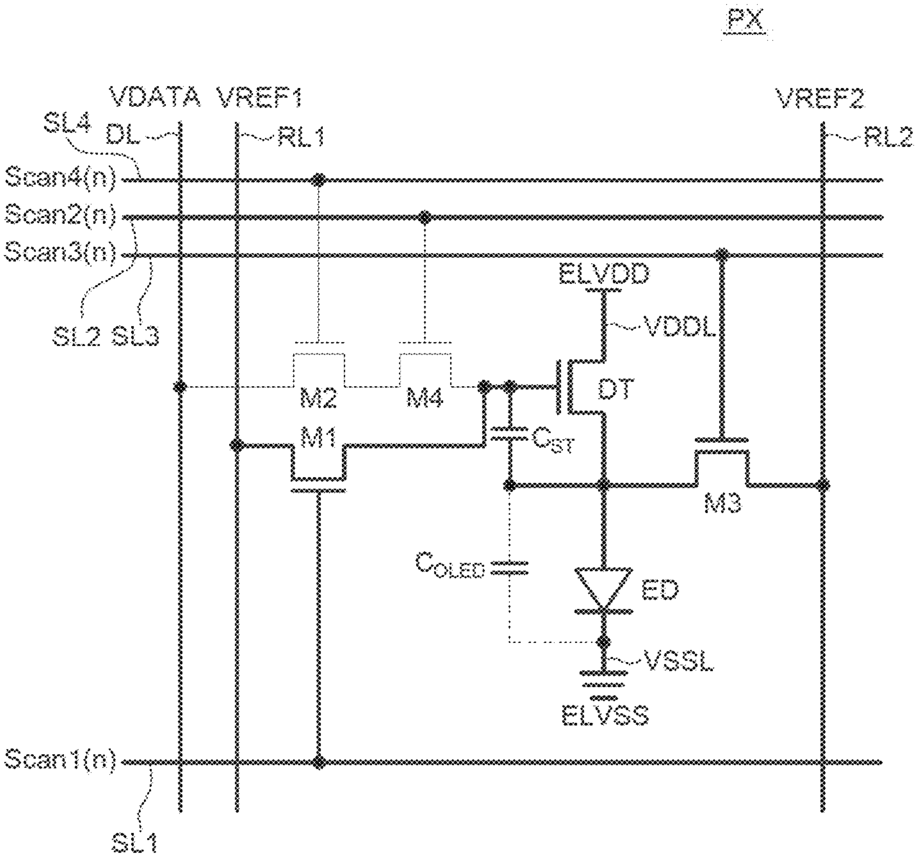
FIGS. 4A to 4H are circuit diagrams and timing charts for explaining the driving of a pixel driving circuit of a display device according to an exemplary embodiment of the present disclosure.
Figure 4B:
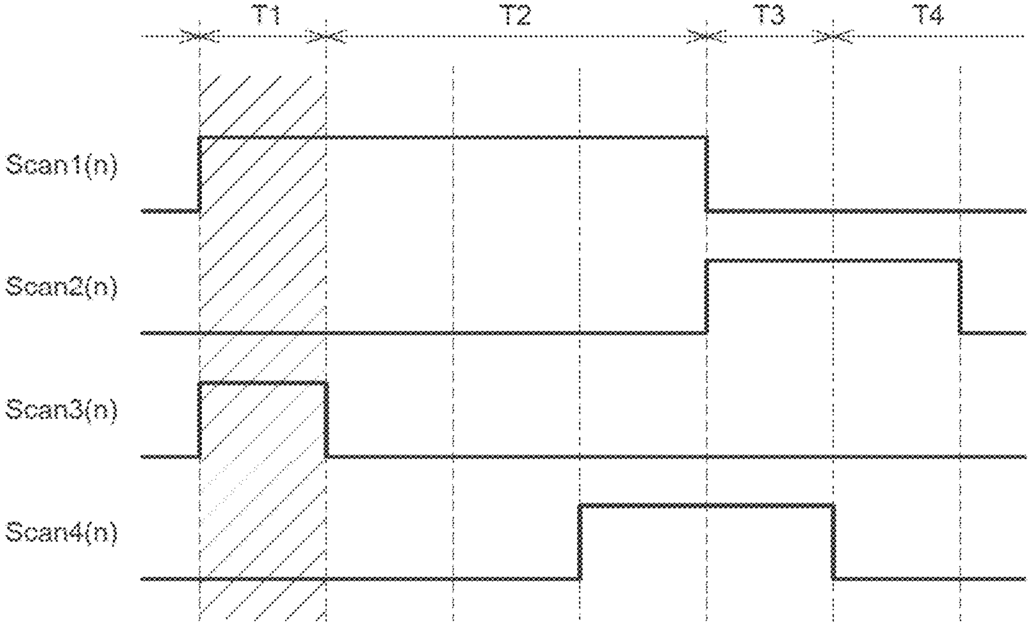
Figure 4C:
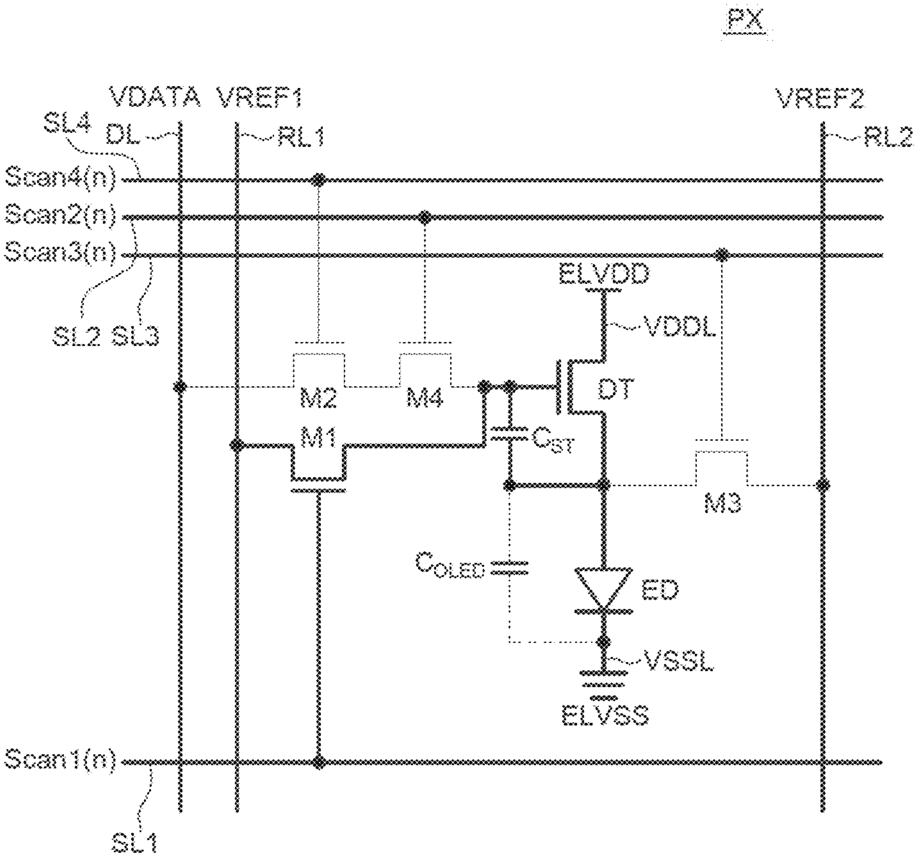
Figure 4D:
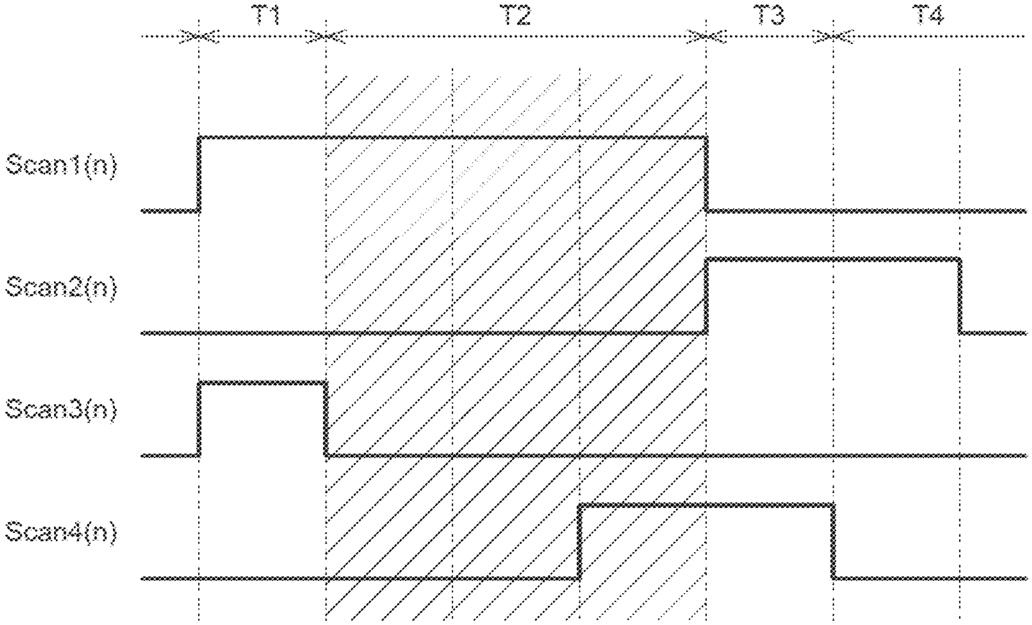
Figure 4E:
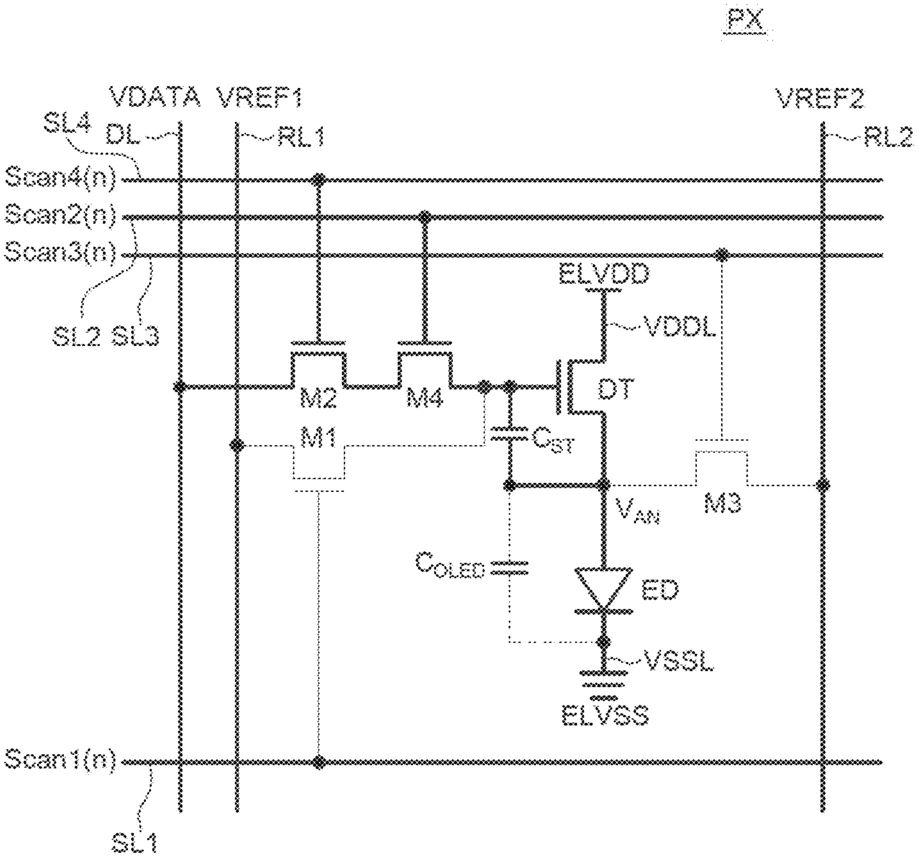
Figure 4F:
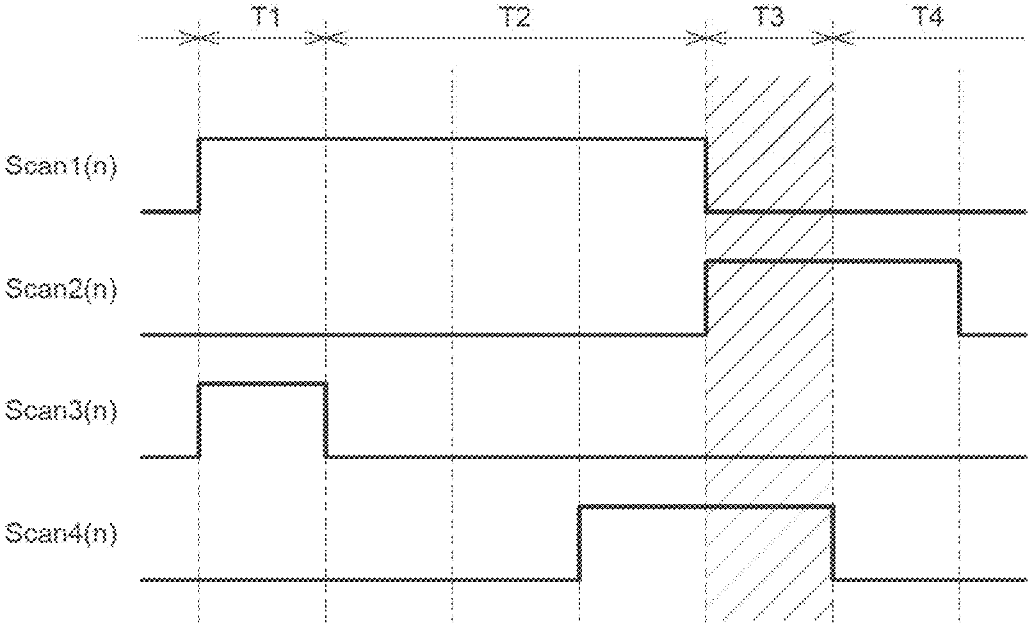
Figure 4G:
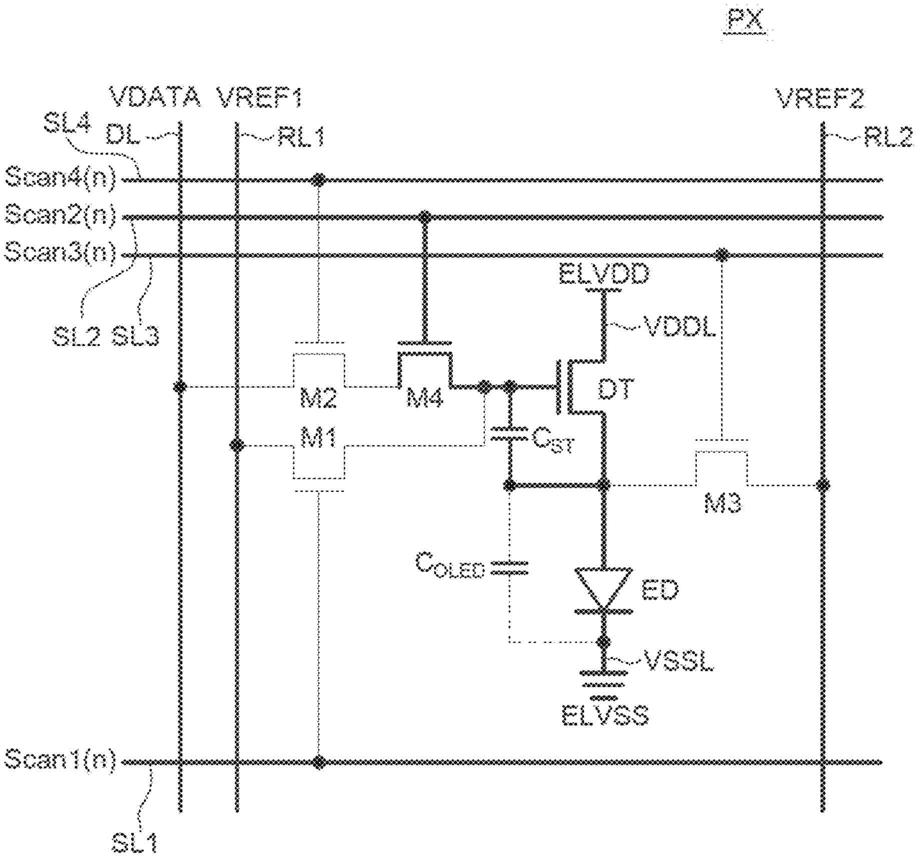

FIGS. 4A to 4H are circuit diagrams and timing charts for explaining the driving of a pixel driving circuit of a display device according to an exemplary embodiment of the present disclosure. FIG. 4A is a circuit diagram corresponding to the first period T1 illustrated in FIG. 48, FIG. 4C is a circuit diagram corresponding to the second period T2 illustrated in FIG. 4D, FIG. 4E is a circuit diagram corresponding to the third period T3 illustrated in FIG. 4F, and FIG. 4G is a circuit diagram corresponding to the fourth period T4 illustrated in FIG. 4H. In FIGS. 4A, 4C, 4E, and 4G, the turned-off transistor is illustrated with a thin solid line and the turned-on transistor is illustrated with a thick solid line.

Specifically, referring to FIGS. 4A and 4B, during the first period T1 in which the light emitting diode ED and the driving transistor DT are initialized, the first scan signal Scan1($n$) and the third scan signal Scan3($n$) which are the gate on voltages are applied to the gate electrode of the first transistor M1 and the gate electrode of the third transistor M3, respectively. By doing this, the first transistor M1 and the third transistor M3 are turned on. In contrast, the second scan signal Scan2($n$) and the fourth scan signal Scan4($n$) which are the gate off voltages are applied to the gate electrode of the second transistor M2 and the gate electrode of the fourth transistor M4, respectively, to turn off the second transistor M2 and the fourth transistor M4. Therefore, as the first transistor M1 is turned on, the first reference voltage VREF1 may be applied to the gate electrode of the driving transistor DT and as the third transistor M3 is turned on, the second reference voltage VREF2 may be applied to the source electrode of the driving transistor DT and the anode of the light emitting diode ED. Therefore, the gate electrode of the driving transistor DT may be initialized by the first reference voltage VREF1 and the anode of the light emitting diode ED and the source electrode of the driving transistor DT may be initialized by the second reference voltage VREF2.

Next, referring to FIGS. 4C and 4D, in the second period T2 which senses the threshold voltage Vth of the driving transistor DT, the first scan signal Scan1(*n*) which is the gate on voltage is applied to the gate electrode of the first transistor M1 to maintain a turned-on state of the first transistor M1. In contrast, the second scan signal Scan2(*n*) and the third scan signal Scan3(*n*) which are the gate off voltages are applied to the fourth transistor M4 and the third transistor M3, respectively, to turn off the fourth transistor M4 and the third transistor M3. Therefore, as the first transistor M1 maintains a turned-on state, the first reference voltage VREF1 may be applied to the gate electrode of the driving transistor DT. Further, as the third transistor M3 is turned off, the application of the second reference voltage VREF2 is blocked. Therefore, the voltage of the source electrode of the driving transistor DT rises by a source-follower operation. The voltage of the source electrode of the driving transistor DT rises during a predetermined time and the rising degree is gradually reduced, resulting in being saturated to a voltage VREF1-Vth obtained by subtracting the threshold voltage from a first reference voltage VREF1 applied to the gate electrode of the driving transistor DT. Therefore, the voltage sensed in the source electrode of the driving transistor DT may be a voltage VREF1-Vth which is obtained by subtracting the threshold voltage Vth from the first reference voltage VREF1. Therefore, a voltage difference of both ends of the storage capacitor $C_{ST}$ corresponds to the threshold voltage Vth so that the threshold voltage Vth may be stored in the storage capacitor $C_{ET}$. Accordingly, the threshold voltage Vth of the driving transistor DT may be compensated. In FIG. 4D, a period in which the threshold voltage of the driving transistor is sensed is three horizontal periods 3H, but is not limited thereto.

In the meantime, during the preceding two horizontal periods 2H of three horizontal periods 3H in the second period T2, the fourth scan signal Scan4(*n*) which is the gate off voltage is applied to the second transistor M2 to turn off the second transistor M2. However, during the subsequent one horizontal period 1H, the fourth scan signal Scan4(*n*) which is the gate on voltage is applied to the second transistor M2 to turn on the second transistor M2. Therefore, the second transistor M2 may transmit the data voltage VDATA to the drain electrode of the fourth transistor M4.

Next, referring to FIGS. 4E and 4F, in the third period T3 in which the data voltage VDATA is input and the mobility of the driving transistor DT is sensed, the second scan signal Scan2(*n*) and the fourth scan signal Scan4(*n*) which are the gate on voltages are applied to the second transistor M2 and the fourth transistor M4, respectively. Therefore, the second transistor M2 and the fourth transistor M4 are turned on. In contrast, the first scan signal Scan1(*n*) and the third scan signal Scan3(*n*) which are the gate off voltages are applied to the first transistor M1 and the third transistor M3, respectively, to turn off the first transistor M1 and the third transistor M3. Therefore, as the second transistor M2 and the fourth transistor M4 are turned on, the data voltage VDATA may be applied to the gate electrode of the driving transistor DT and as the third transistor M3 maintains the turned-off state, the application of the second reference voltage VREF2 is blocked to rise the voltage of the source electrode of the driving transistor DT. At this time, the rising speed of the voltage of the source electrode of the driving transistor DT represents the current capability of the driving transistor DT, that is, the mobility μ. Accordingly, the larger the mobility p of the driving transistor DT, the faster the voltage of the source electrode of the driving transistor DT rises so that the voltage difference $V_{GS}$ of the gate electrode and the source electrode of the driving transistor DT is quickly reduced. Therefore, the rapid increase of the current which flows to the source electrode of the driving transistor DT may be compensated. Further, the smaller the mobility μ of the driving transistor DT, the slower the voltage of the source electrode of the driving transistor DT rises so that the voltage difference $V_{GS}$ of the gate electrode and the source electrode of the driving transistor DT is slowly reduced. Therefore, the slow increase of the current which flows to the source electrode of the driving transistor DT may be compensated. Here, the voltage of the source electrode of the driving transistor DT is equal to the voltage of the anode of the light emitting diode ED and a voltage $V_{AN}$ of the anode of the light emitting diode ED may be derived by the following Equation 1.

$$V_{AN} = \frac{C_{ST}}{C_{ST} + C_{OLED}} V_{Data} + \frac{C_{OLED}}{C_{ST} + C_{OLED}} V_{REF} - V_{TH} \quad \text{[Equation 1]}$$

At this time. $C_{ST}$ may be a capacitance of the storage capacitor $C_{ST}$, $C_{OLED}$ may be a capacitance of the light emitting diode ED, $V_{DATA}$ may be a data voltage VDATA, $V_{REF}$ may be a first reference voltage VREF1, and $V_{TH}$ may be a threshold voltage of the driving transistor.

Figure 4H:
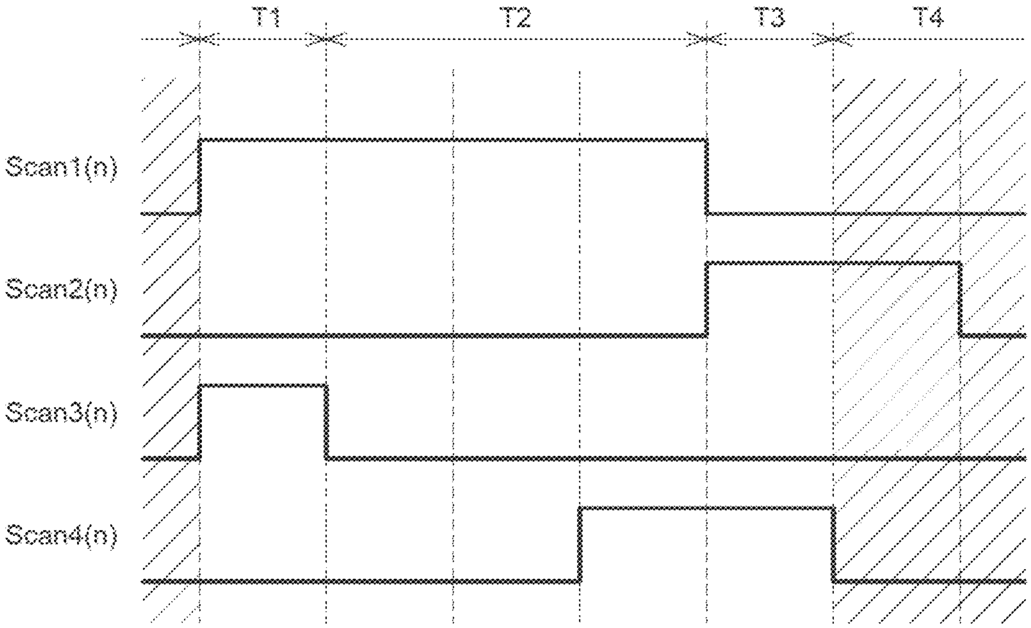

Next, referring to FIGS. 4G and 4H, during the fourth period T4, the first transistor M1, the third transistor M3, and the fourth transistor M4 to which the first scan signal Scan1(*n*)), the third scan signal Scan3(*n*), and the fourth scan signal Scan4(*n*) of the gate off voltages are applied, respectively, are turned off. Therefore, the gate electrode and the source electrode of the driving transistor DT are floated. Therefore, a driving current flows to the light emitting diode ED from the driving transistor DT while maintaining a potential difference between a voltage of the gate electrode of the driving transistor DT and a voltage of the source electrode by a coupling phenomenon of the capacitor to emit light. The driving current flowing from the driving transistor DT to the light emitting diode ED may be derived by the following Equation 2.

$$I_{DT} = \mu_n C_{OX} \frac{W}{L} \left( \frac{C_{OLED}}{C_{ST} + C_{OLED}} (V_{Data} + V_{AN} - V_{ST}) \right)^2 \quad \text{[Equation 2]}$$

At this time, $I_{DT}$ may be a driving current flowing from the driving transistor DT to the light emitting diode ED, $\mu_n$ may be a mobility, $C_{OX}$ may be oxide capacitance, W may be a channel width, L may be a channel length, and $V_{DATA}$ may be a data voltage.

There are various types of the pixel driving circuit of the display device. Specifically, the pixel driving circuit may be classified by the number of transistors and capacitors included in the pixel driving circuit. At this time, generally, an area occupied by one capacitor is significantly larger than an area occupied by one transistor. Therefore, when the pixel driving circuit includes two or more capacitors, the area occupied by the pixel driving circuit may be increased. Similarly, in order to diversify the function of the pixel driving circuit, when the number of transistors is increased, the area occupied by the pixel driving circuit may be increased.

Further, in a normal pixel driving circuit, it is difficult to compensate for both the threshold voltage and the mobility of the driving transistor. For example, it is difficult for one pixel driving circuit to implement compensation for all a positive bias of a threshold voltage of the driving transistor, a negative bias of a threshold voltage of the driving transistor, and a mobility of the driving transistor.

In the display device 100 according to the exemplary embodiment of the present disclosure, all the threshold voltages and the mobility of the driving transistor DT can be internally compensated. Specifically, the threshold voltages and the mobility of the driving transistor DT are internally compensated without an additional configuration at the outside of the pixel to correspond to the change of the driving transistor DT, thereby improving an image quality. Further, in the display device 100 according to the exemplary embodiment of the present disclosure, both the positive bias of the threshold voltage of the driving transistor DT and the negative bias of the threshold voltage of the driving transistor DT may be compensated.

Further, in the display device 100 according to the exemplary embodiment of the present disclosure, an area occupied by the pixel driving circuit may be minimized. As described above, generally, the capacitor may occupy a larger area in the pixel than the transistor. Specifically, when many capacitors are used in the pixel, there is a problem in that the area of the pixel is increased. Therefore, in the display device 100 according to the exemplary embodiment of the present disclosure, the pixel driving circuit uses one capacitor to minimize an area of the pixel. Further, in the display device 100 according to the exemplary embodiment of the present disclosure, the pixel driving circuit implements the above-described internal compensation and the number of transistors may be minimized.

Further, in the display device 100 according to the exemplary embodiment of the present disclosure, the data line DL to which the data voltage VDATA is supplied and the reference voltage lines RL1 and RL2 to which the reference voltages VREF1 and VREF2 are supplied are separately disposed to minimize the power consumption. For example, when the pixel driving circuit is implemented such that one line to which the data voltage and the reference voltage are supplied is connected to one transistor to alternately supply the reference voltage and the data voltage, the reference voltage and the data voltage should be alternately supplied in one line. Accordingly, the frequency needs to be doubled and a fluctuation width of the applied voltage needs to be large. Accordingly, there is a problem in that the power consumption is increased in the pixel driving circuit. Therefore, in the display device 100 according to the exemplary embodiment of the present disclosure, the data line DL to which the data voltage VDATA is supplied and the reference voltage lines RL1 and RL2 to which the reference voltages VREF1 and VREF2 are supplied are separately disposed. Further, the data line DL and the reference voltage lines RL1 and RL2 are connected to different transistors. Therefore, the reference voltages VREF1 and VREF2 are fixedly supplied to the reference voltage lines RL1 and RL2 so that the power consumption is small. Further, the data line DL is supplied only with the data voltage VDATA. Accordingly, as compared with an example that the reference voltages VREF1 and VREF2 and the data voltage VDATA are alternately supplied, the frequency is reduced by a half and the power consumption may be reduced.

Figure 5:
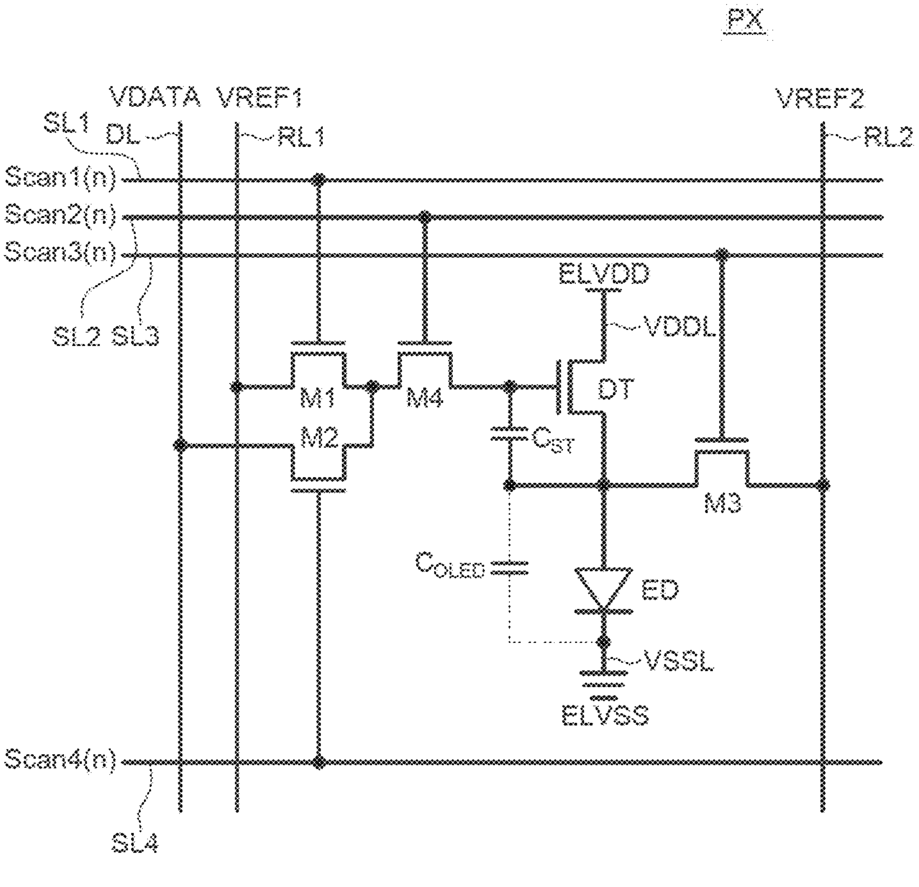
FIG. 5 is a circuit diagram illustrating a pixel driving circuit of a pixel of a display device according to another exemplary embodiment of the present disclosure.

FIG. 5 is a circuit diagram illustrating a pixel driving circuit of a pixel of a display device according to another exemplary embodiment of the present disclosure. A pixel driving circuit of FIG. 5 is substantially the same as the pixel driving circuit of FIG. 2 except for the first transistor M1, and the second transistor M2, and the fourth transistor M4 so that a redundancy description will be omitted.

Referring to FIG. 5, the first transistor M1 transmits a first reference voltage VREF1 to the gate electrode of the driving transistor DT. The first transistor M1 is controlled by the first scan signal Scan1(*n*) and is connected between the first reference voltage line RL1 which supplies the first reference voltage VREF1 and the fourth transistor M4. Specifically, the gate electrode of the first transistor M1 may be connected to a first scan line SL1 which supplies a first 1M scan signal Scan1(*n*) and the drain electrode of the first transistor M1 may be connected to a first reference voltage line RL1 which supplies the first reference voltage VREF1. The source electrode of the first transistor M1 may be connected to the drain electrode of the fourth transistor M4 and the source electrode of the second transistor M2. Therefore, the first transistor M1 is turned on by the first scan signal Scan1(*n*) to transmit the first reference voltage VREF1 to the gate electrode of the driving transistor DT through the fourth transistor M4.

The second transistor M2 transmits the data voltage VDATA to the gate electrode of the driving transistor DT. Specifically, the second transistor M2 may transmit the data voltage VDATA to the gate electrode of the driving transistor DT through the fourth transistor M4. The second transistor M2 is controlled by the fourth scan signal Scan4(*n*) and is connected between the data line DL which supplies the data voltage VDATA and the fourth transistor M4. Specifically, a gate electrode of the second transistor M2 may be connected to a fourth scan line SL4 which supplies a fourth scan signal Scan4(*n*) and a drain electrode of the second transistor M2 may be connected to the data line DL which supplies the data voltage VDATA. The source electrode of the second transistor M2 may be connected to the drain electrode of the fourth transistor M4 and the source electrode of the first transistor M1. Therefore, the second transistor M2 is turned on by the fourth scan signal Scan4(*n*) to transmit the data voltage VDATA to the gate electrode of the driving transistor DT through the fourth transistor M4.

The fourth transistor M4 is connected between the second transistor 142 and the driving transistor DT to transmit the data voltage VDATA to the gate electrode of the driving transistor DT. Specifically, the fourth transistor M4 is controlled by the second scan signal Scan2(*n*) and is connected between the second transistor M2 and the gate electrode of the driving transistor DT. The fourth transistor M4 may transmit the first reference voltage VREF1 applied from the first transistor M1 or the data voltage VDATA applied from the second transistor M2 to the gate electrode of the driving transistor DT. Specifically, the gate electrode of the fourth transistor M4 may be connected to the second scan line SL2 which supplies the second scan signal Scan2(*n*) and the drain electrode of the fourth transistor M4 may be connected to the source electrode of the first transistor M1 and the source electrode of the second transistor M2. The source electrode of the fourth transistor M4 may be connected to the gate electrode of the driving transistor DT. Therefore, the fourth transistor 144 is turned on by the second scan signal Scan2(*n*) to apply the data voltage VDATA or the first reference voltage VREF1 to the gate electrode of the driving transistor DT.

Figure 6:
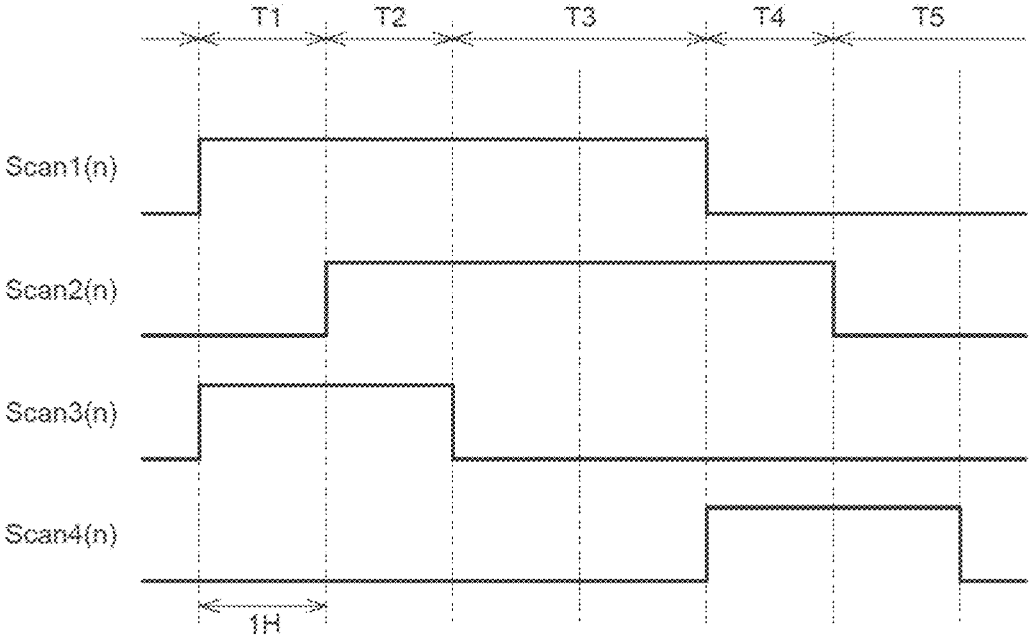
FIG. 6 is a timing chart for explaining the driving of a pixel driving circuit of a display device according to another exemplary embodiment of the present disclosure.

FIG. 6 is a timing chart for explaining the driving of a pixel driving circuit of a display device according to another exemplary embodiment of the present disclosure. FIG. 5 is a timing chart of a first scan signal, a second scan signal, a third scan signal, and a fourth scan signal.

Referring to FIG. 6, the pixel driving circuit is driven by a first period T1, a second period T2, a third period T3, and a fourth period T4.

First, the first period T1 in which the light emitting diode ED is initialized may be one horizontal period (1H). During the first period T1, the first scan signal Scan1(*n*) and the third scan signal Scan3(*n*) are applied as gate on voltages and the second scan signal Scan2(*n*) and the fourth scan signal Scan4(*n*) are applied as gate off voltages.

Next, the second period T2 in which the driving transistor DT is initialized may be one horizontal period (1H). During the second period T2, the first scan signal Scan1(*n*), the second scan signal Scan2(*n*), and the third scan signal Scan3(*n*) are applied as gate on voltages and the fourth scan signal Scan4(*n*) is applied as a gate off voltage.

Next, the third period T3 in which the threshold voltage of the driving transistor DT is sensed may be two horizontal periods (2H). During the third period T3, the first scan signal Scan1(*n*) and the second scan signal Scan2(*n*) are applied as gate on voltages and the third scan signal Scan3(*n*) and the fourth scan signal Scan4(*n*) are applied as gate off voltages.

Next, a fourth period T4 in which the data voltage VDATA is input and a mobility of the driving transistor DT is sensed may be one horizontal period 1H. During the fourth period T4, the second scan signal Scan2(*n*) and the fourth scan signal Scan4(*n*) are applied as gate on voltages and the first scan signal Scan1(*n*) and the third scan signal Scan3(*n*) are applied as gate off voltages.

Next, a fifth period T5 in which the light emitting diode ED emits light is continued. During only the preceding one horizontal period 1H of two horizontal periods 2H in the fifth period T5, the fourth scan signal Scan4(*n*) is applied as a gate on voltage and the first scan signal Scan1(*n*), the third scan signal Scan3(*n*), and the fourth scan signal Scan4(*n*) are applied as gate off voltages.

Hereinafter, the specific driving of a pixel driving circuit which is disposed in one pixel of a display device according to another exemplary embodiment of the present disclosure will be described in detail with reference to FIGS. 7A to 7J.

Figure 7A:
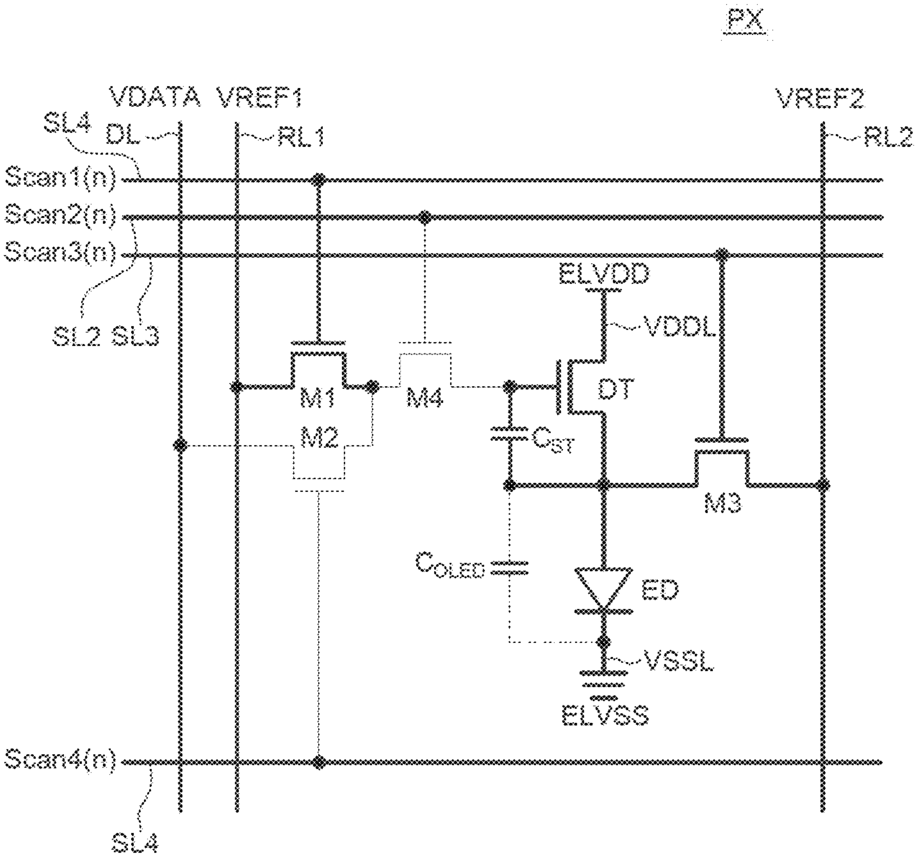
FIGS. 7A to 7J are circuit diagrams and timing charts for explaining the driving of a pixel driving circuit of a display device according to another exemplary embodiment of the present disclosure.
Figure 7B:
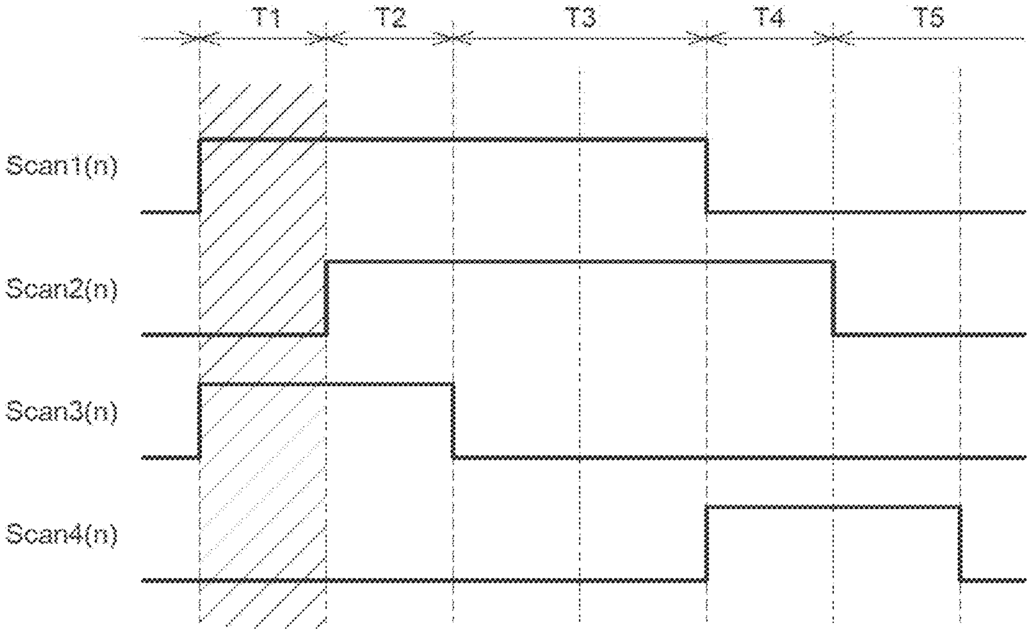
Figure 7C:
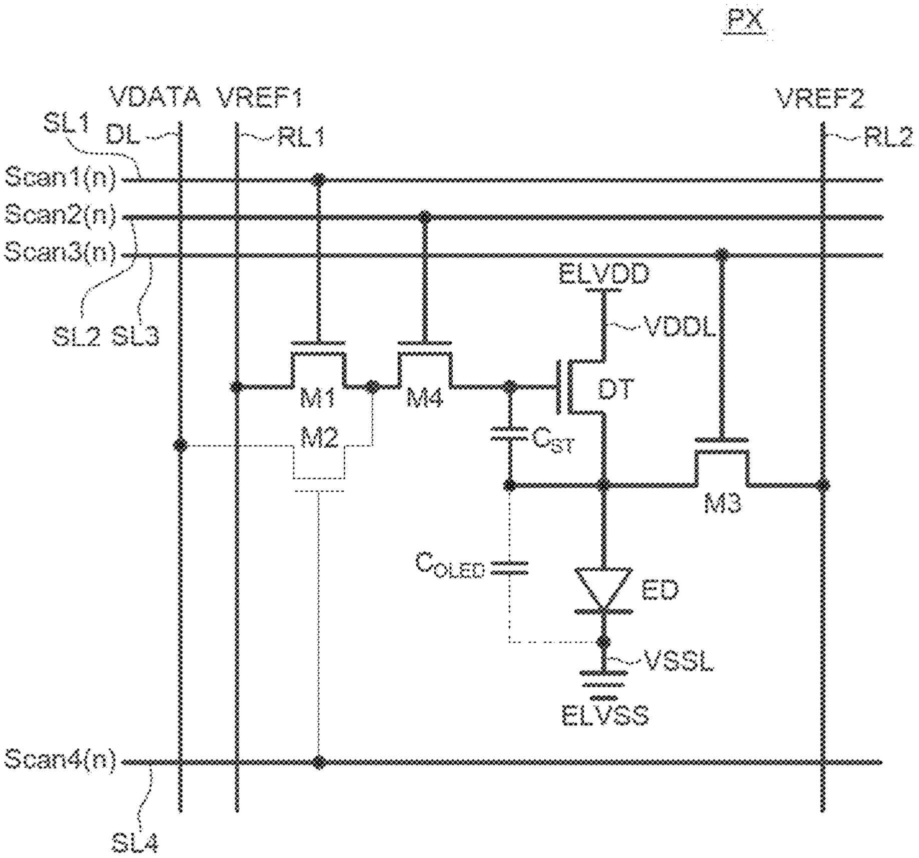
Figure 7D:
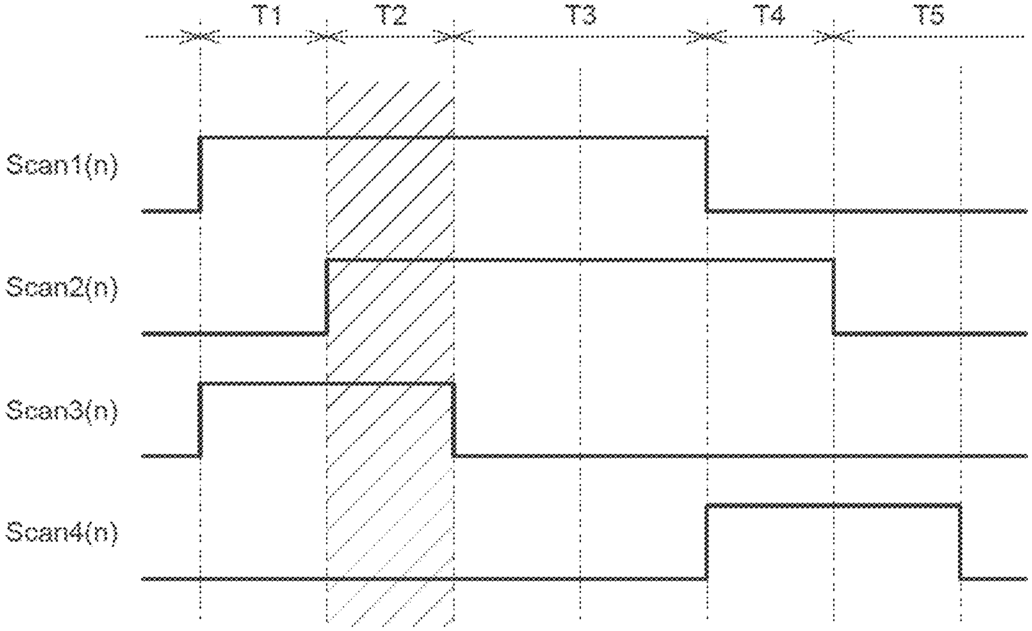
Figure 7E:
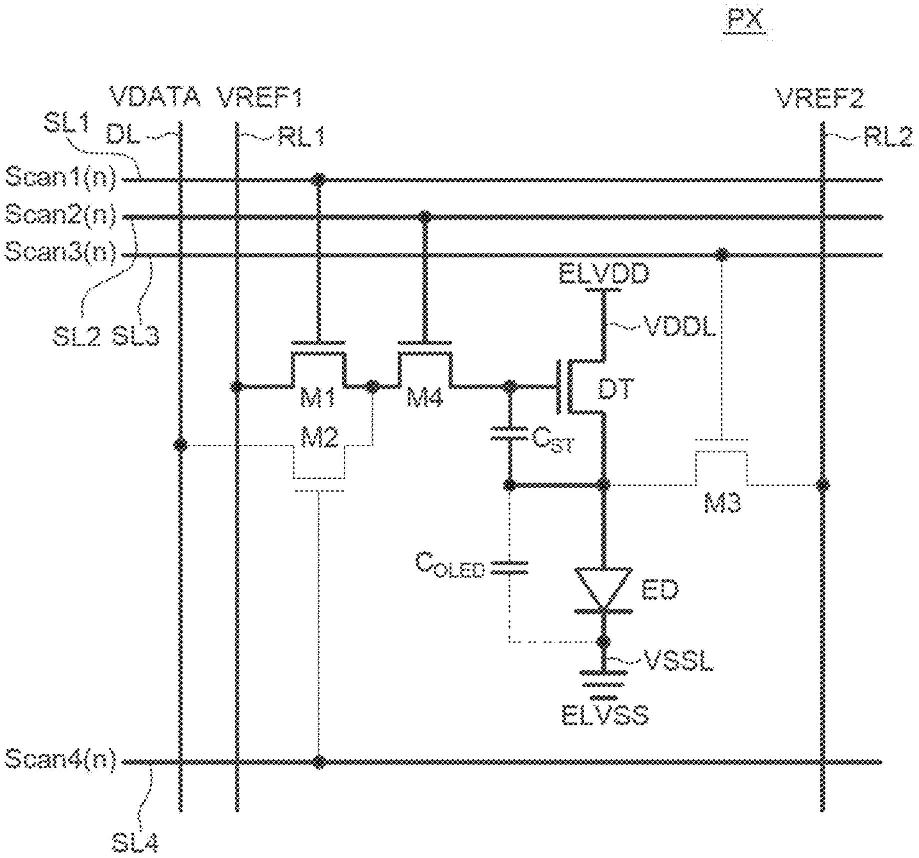
Figure 7F:
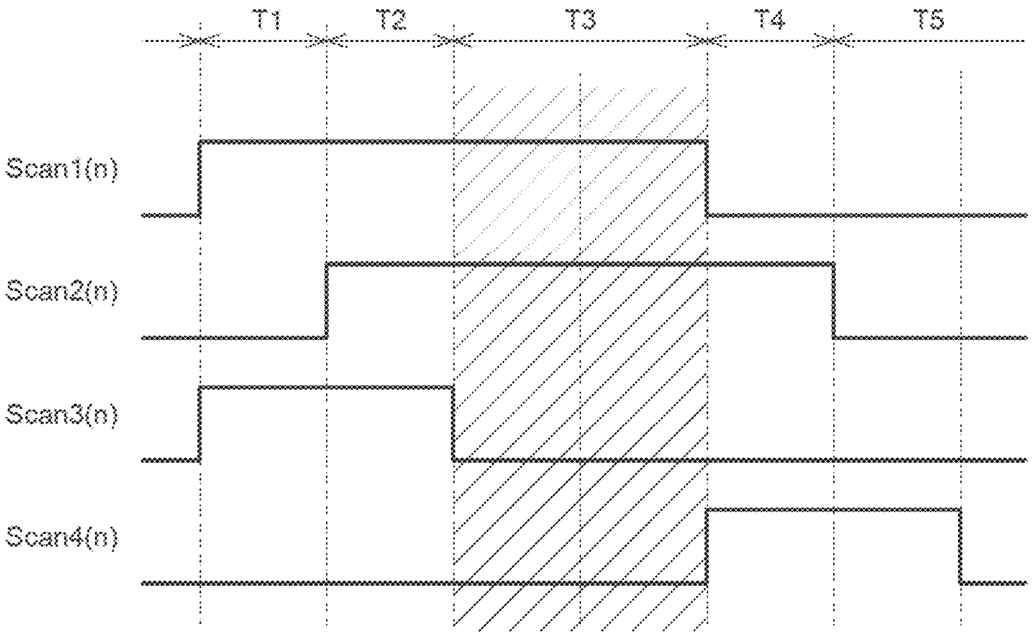
Figure 7G:
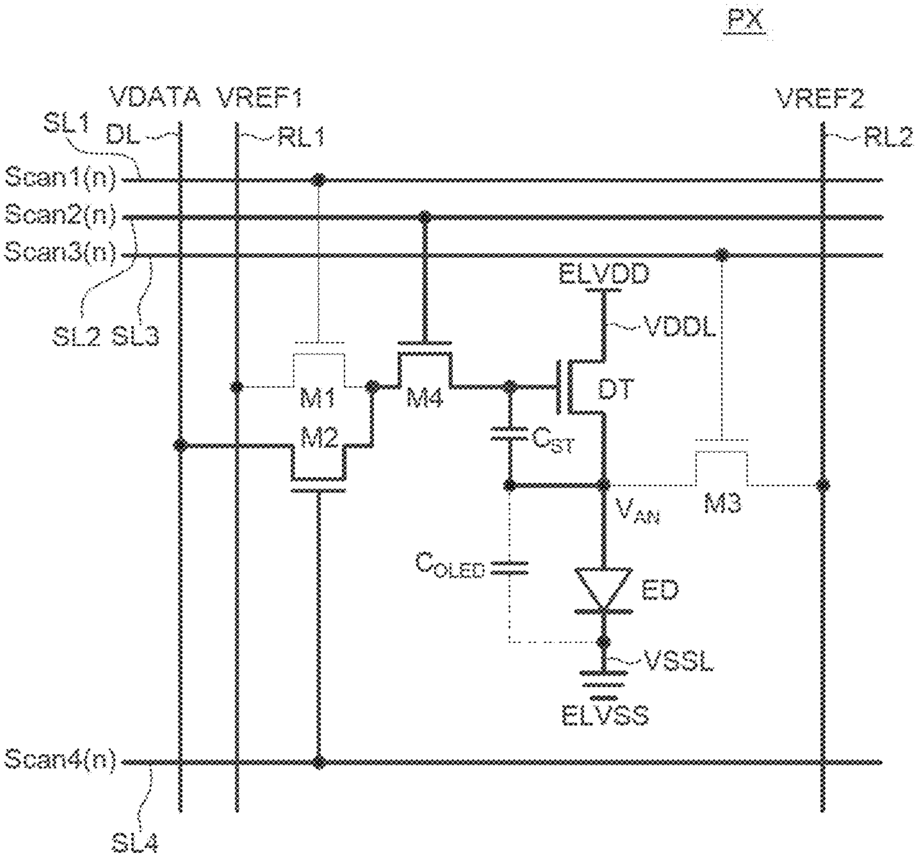
Figure 7H:
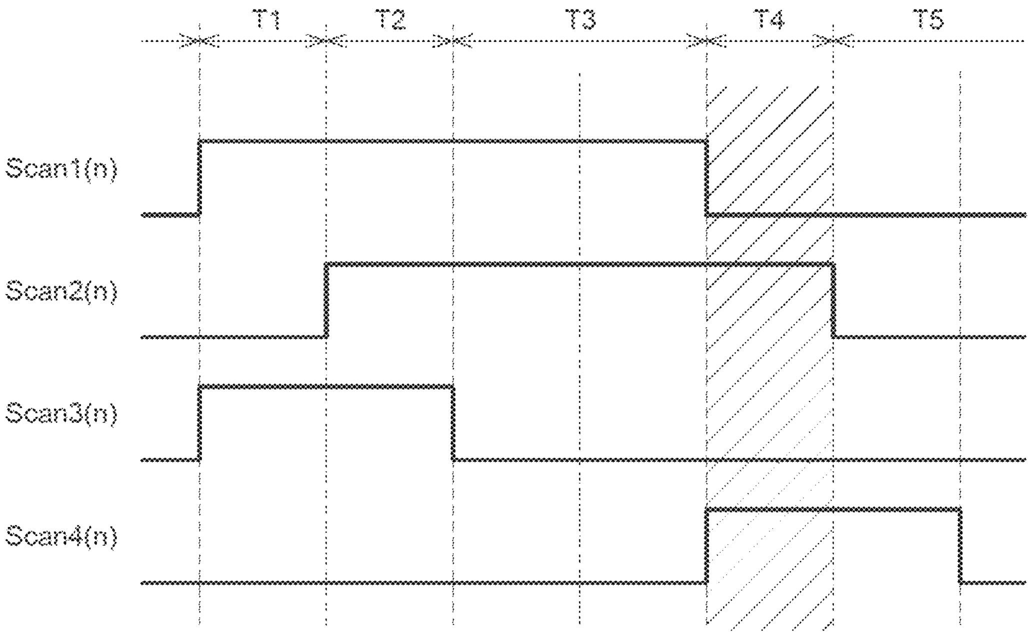
Figure 7I:
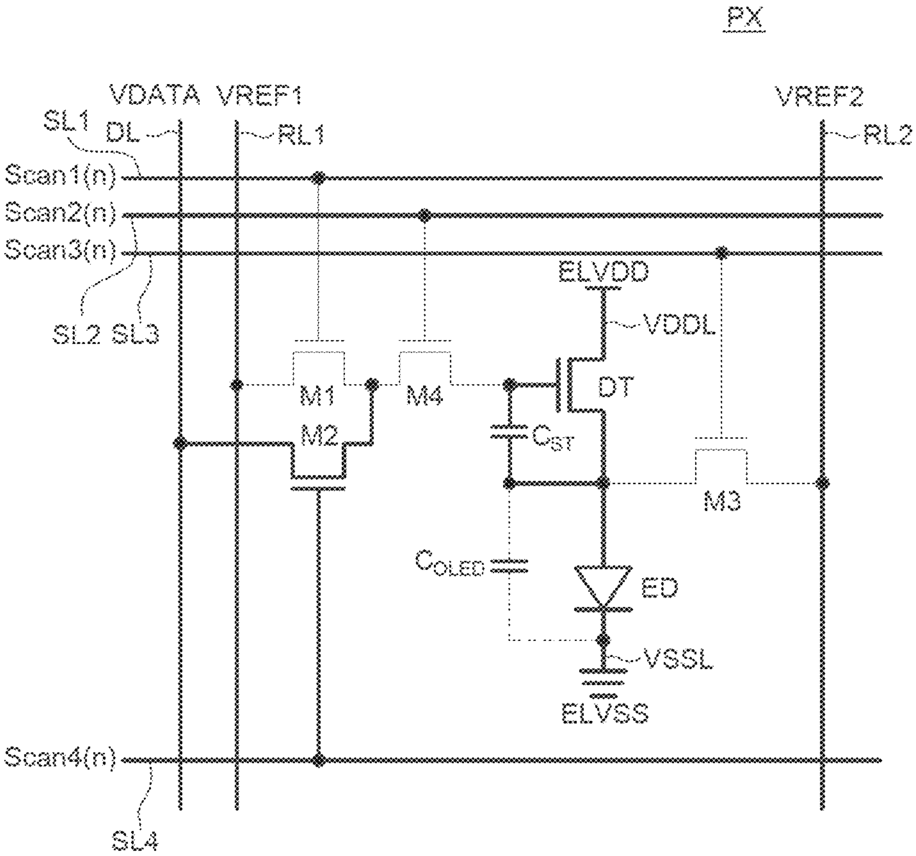

FIGS. 7A to 7J are circuit diagrams and timing charts for explaining the driving of a pixel driving circuit of a display device according to another exemplary embodiment of the present disclosure. FIG. 7A is a circuit diagram corresponding to the first period T1 illustrated in FIG. 7B, FIG. 7C is a circuit diagram corresponding to the second period T2 illustrated in FIG. 7D, and FIG. 7E is a circuit diagram corresponding to the third period T3 illustrated in FIG. 7F. FIG. 7G is a circuit diagram corresponding to the fourth period T4 illustrated in FIG. 7H, and FIG. 7I is a circuit diagram corresponding to the fifth period T5 illustrated in FIG. 7J. In FIGS. 7A, 7C, 7E, 7G, and 7I, the turned-off transistor is illustrated with a thin solid line and the turned-on transistor is illustrated with a thick solid line.

Specifically, referring to FIGS. 7A and 7B, during the first period T1 in which the light emitting diode ED is initialized, the first scan signal Scan1(*n*) and the third scan signal Scan3(*n*) which are the gate on voltages are applied to the gate electrode of the first transistor M1 and the gate electrode of the third transistor M3, respectively. By doing this, the first transistor M1 and the third transistor M3 are turned on. In contrast, the second scan signal Scan2(*n*) and the fourth scan signal Scan4(*n*) which are the gate off voltages are applied to the gate electrode of the second transistor M2 and the gate electrode of the fourth transistor M4, respectively, to turn off the second transistor M2 and the fourth transistor M4. Therefore, as the first transistor M1 is turned on, the first reference voltage VREF1 may be applied to the source electrode of the first transistor M1. Further, as the third transistor M3 is turned on, the second reference voltage VREF2 may be applied to the source electrode of the driving transistor DT and the anode of the light emitting diode ED. Therefore, the anode of the light emitting diode ED and the source electrode of the driving transistor DT may be initialized by the second reference voltage VREF2.

Next, referring to FIGS. 7C and 7D, during the second period T2 in which the driving transistor DT is initialized, the first scan signal Scan1(*n*), the second scan signal Scan2 (*n*) and the third scan signal Scan3(*n*), which are the gate on voltage, are applied to the gate electrode of the first transistor M1, the gate electrode of the fourth transistor M4, and the gate electrode of the third transistor M43, respectively. By doing this, the first transistor M1, the fourth transistor 144, and the third transistor M3 are turned on. In contrast, the fourth scan signal Scan4(*n*) which is the gate off voltage is applied to the gate electrode of the second transistor M2 to turn off the second transistor M2. Therefore, as the first transistor M1, the fourth transistor M4, and the third transistor M3 are turned on, the first reference voltage VREF1 may be applied to the gate electrode of the driving transistor DT and the second reference voltage VREF2 may be applied to the source electrode of the driving transistor DT and the anode of the light emitting diode ED. Therefore, the gate electrode of the driving transistor DT may be initialized by the first reference voltage VREF1 and the anode of the light emitting diode ED and the source electrode of the driving transistor DT may be initialized by the second reference voltage VREF2.

Next, referring to FIGS. 7E and 7F, during the third period T3 in which the threshold voltage of the driving transistor DT is sensed, the first scan signal Scan1(*n*) and the second scan signal Scan2(*n*) which are the gate on voltages are applied to the gate electrode of the first transistor M1 and the gate electrode of the fourth transistor M4, respectively. Accordingly, the first transistor M1 and the fourth transistor M4 are maintained to be turned on. In contrast, the third scan signal Scan3(*n*) and the fourth scan signal Scan4(*n*) which are the gate off voltages are applied to the second transistor M2 and the third transistor M3, respectively to turn off the second transistor M2 and the third transistor M3. Therefore, the first reference voltage VREF1 may be maintained to be applied to the gate electrode of the driving transistor DT by the turned-on first transistor M1 and fourth transistor M4. Further, as the third transistor 143 is turned off, the application of the second reference voltage VREF2 is blocked. Therefore, the voltage of the source electrode of the driving transistor DT rises by a source-follower operation. The voltage of the source electrode of the driving transistor DT rises during a predetermined time and the rising degree is gradually reduced, resulting in being saturated to a voltage VREF1-Vth obtained by subtracting the threshold voltage from a first reference voltage VREF1 applied to the gate electrode of the driving transistor DT. Therefore, the voltage sensed in the source electrode of the driving transistor DT may be a voltage VREF1-Vth which is obtained by subtracting the threshold voltage Vth from the first reference voltage VREF1. Therefore, a voltage difference of both ends of the storage capacitor $C_{ST}$ corresponds to the threshold voltage Vth so that the threshold voltage Vth may be stored in the storage capacitor $C_{ST}$. Accordingly, the threshold voltage Vth of the driving transistor DT may be compensated. Even though in FIG. 7F, it is illustrated that a period for sensing the threshold voltage of the driving transistor is two horizontal periods 2H, it is not limited thereto.

Next, referring to FIGS. 7G and 7H, in the fourth period T4 in which the data voltage VDATA is input and the mobility of the driving transistor DT is sensed, the second scan signal Scan2(*n*) and the fourth scan signal Scan4(*n*) which are the gate on voltages are applied to the fourth transistor 144 and the second transistor M2, respectively. Therefore, the fourth transistor M4 and the second transistor M2 are turned on. In contrast, the first scan signal Scan1(*n*) and the third scan signal Scan3(*n*) which are the gate off voltage are applied to the first transistor M1 and the third transistor M3, respectively to turn off the first transistor M1 and the third transistor M3. Therefore, as the second transistor M2 and the fourth transistor M4 are turned on, the data voltage VDATA may be applied to the gate electrode of the driving transistor DT and as the third transistor M3 is turned off, the application of the second reference voltage VREF2 is blocked to rise the voltage of the source electrode of the driving transistor DT. At this time, the rising speed of the voltage of the source electrode of the driving transistor DT represents the current capability of the driving transistor DT, that is, the mobility μ. Accordingly, the larger the mobility μ of the driving transistor DT, the faster the voltage of the source electrode of the driving transistor DT rises so that the voltage difference $V_{GS}$ of the gate electrode and the source electrode of the driving transistor DT is quickly reduced. Therefore, the rapid increase of the current which flows to the source electrode of the driving transistor DT may be compensated. Further, the smaller the mobility μ of the driving transistor DT, the slower the voltage of the source electrode of the driving transistor DT rises so that the voltage difference $V_{GS}$ of the gate electrode and the source electrode of the driving transistor DT is slowly reduced. Therefore, the slow increase of the current which flows to the source electrode of the driving transistor DT may be compensated. Here, the voltage of the source electrode of the driving transistor DT is equal to the voltage of the anode of the light emitting diode ED and a voltage $V_{AN}$ of the anode of the light emitting diode ED may be derived by the following Equation 3.

$$V_{AN} = \frac{C_{ST}}{C_{ST} + C_{OLED}} V_{Data} + \frac{C_{OLED}}{C_{ST} + C_{OLED}} V_{REF} - V_{TH} \quad \text{[Equation 3]}$$

At this time, $C_{ST}$ may be a capacitance of the storage capacitor $C_{ST}$, $C_{OLED}$ may be a capacitance of the light emitting diode ED, $V_{DATA}$ may be a data voltage VDATA, $V_{REF}$ may be a first reference voltage VREF1, and $V_{TH}$ may be a threshold voltage of the driving transistor.

Figure 7J:
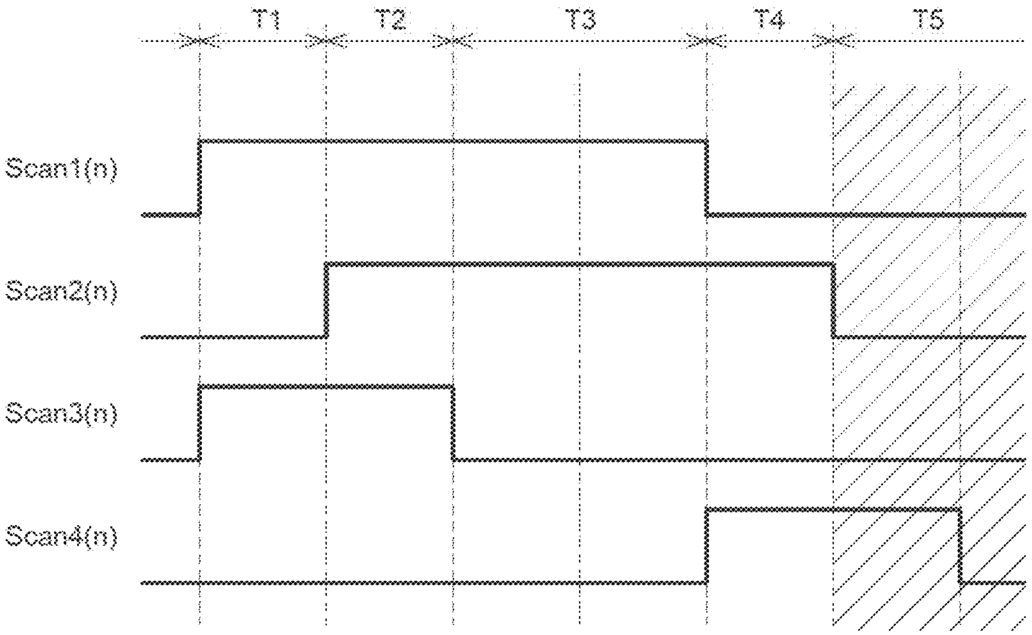

Next, referring to FIGS. 7I and 7J, during the fifth period T5, the first transistor M1, the fourth transistor M4, and the third transistor M3 to which the first scan signal Scan1(*n*), the second scan signal Scan2(*n*), and the third scan signal Scan3(*n*) of the gate off voltage are applied, respectively, are turned off. Therefore, as the fourth transistor M4 and the third transistor M3 are turned off, the gate electrode and the source electrode of the driving transistor DT are floated. Therefore, a driving current flows to the light emitting diode ED from the driving transistor DT while maintaining a potential difference between a voltage of the gate electrode of the driving transistor DT and a voltage of the source electrode by a coupling phenomenon of the capacitor to emit light. The driving current flowing from the driving transistor DT to the light emitting diode ED may be derived by the following Equation 4.

$$I_{DT} = \mu_n C_{OX} \frac{W}{L} \left( \frac{C_{OLED}}{C_{ST} + C_{OLED}} (V_{Data} + V_{AN} - V_{ST}) \right)^2 \quad \text{[Equation 4]}$$

At this time, $I_{DT}$ may be a driving current flowing from the driving transistor DT to the light emitting diode ED, $\mu_n$ may be a mobility, $C_{OX}$ may be oxide capacitance, W may be a channel width, L may be a channel length, and $V_{DATA}$ may be a data voltage.

In the meantime, during the preceding one horizontal period 1H of two horizontal periods 2H of the fifth period T5, the fourth scan signal Scan4(*n*) of the gate on voltage is applied to the second transistor M2 to maintain a turned-on state. However, during the subsequent one horizontal period 1H, the fourth scan signal Scan4(*n*) which is the gate oft voltage is applied to the second transistor M2 to turn off the second transistor M2.

In the display device according to another exemplary embodiment of the present disclosure, all the threshold voltages and the mobility of the driving transistor DT can be internally compensated. Specifically, the threshold voltages and the mobility of the driving transistor DT are internally compensated without an additional configuration at the outside of the pixel to correspond to the change of the driving transistor DT, thereby improving an image quality. Further, in the display device according to another exemplary embodiment of the present disclosure, both the positive bias of the threshold voltage of the driving transistor DT and the negative bias of the threshold voltage of the driving transistor DT may be compensated.

Further, in the display device according to another exemplary embodiment of the present disclosure, an area occupied by the pixel driving circuit may be minimized. That is, in the display device according to another exemplary embodiment of the present disclosure, the pixel driving circuit uses one capacitor to minimize an area of the pixel. Further, in the display device according to another exemplary embodiment of the present disclosure, the pixel driving circuit may implement the above-described internal compensation and also minimize the number of transistors.

Further, in the display device according to another exemplary embodiment of the present disclosure, the data line DL to which the data voltage VDATA is supplied and the reference voltage lines RL1 and RL2 to which the reference voltages VREF1 and VREF2 are supplied are separately disposed to minimize the power consumption. Accordingly, in the display device according to another exemplary embodiment of the present disclosure, the reference voltages VREF1 and VREF2 are fixedly supplied to the reference voltage lines RL1 and RL2 so that power consumption is small. Further, the data line DL is supplied with only the data voltage so that as compared with the example that the reference voltages VREF1 and VREF2 and the data voltage VDATA are alternately supplied, the frequency is reduced by a half and the power consumption may be reduced.

Further, in the display device according to another exemplary embodiment of the present disclosure, all the first scan signal Scan1(*n*), the second scan signal Scan2(*n*), the third scan signal Scan3(*n*), and the fourth scan signal Scan4(*n*) are applied for two or more horizontal periods 2H. Therefore, even though a rising time and a falling time are considered, a sufficient time to drive the transistors may be ensured.

Figure 8:
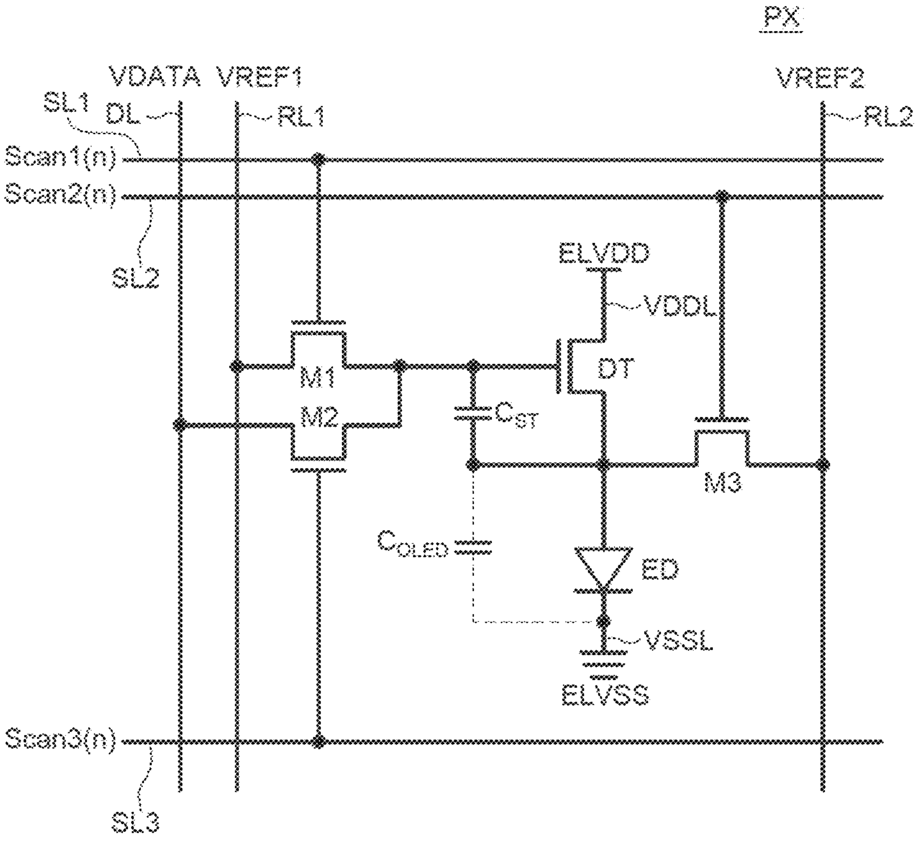
FIG. 8 is a circuit diagram illustrating a pixel driving circuit of a pixel of a display device according to still another exemplary embodiment of the present disclosure.

FIG. 8 is a circuit diagram illustrating a pixel driving circuit of a pixel of a display device according to still another exemplary embodiment of the present disclosure. Referring to FIG. 8, a pixel driving circuit includes a driving transistor DT, a storage capacitor $C_{ST}$, a first transistor M1, a second transistor M2, and a third transistor M3. Therefore, the pixel driving circuit is "4T1C" circuit including four transistors and one storage capacitor.

Referring to FIG. 8, the pixel driving circuit is substantially the same as the pixel driving circuit of FIG. 5 except for the omitted fourth transistor M4 and the first transistor M1 and the second transistor M2 so that a redundant description will be omitted.

Referring to FIG. 8, the first transistor M1 transmits a first reference voltage VREF1 to the gate electrode of the driving transistor DT. The first transistor M1 is controlled by the first scan signal Scan1(*n*) and is connected between the first reference voltage line RL1 which supplies the first reference voltage VREF1 and the gate electrode of the driving transistor DT. Specifically, the gate electrode of the first transistor M1 may be connected to a first scan line SL1 which supplies a first scan signal Scan1(*n*) and the drain electrode of the first transistor M1 may be connected to a first reference voltage line RL1 which supplies the first reference voltage VREF1. The source electrode of the first transistor M1 may be connected to the gate electrode of the driving transistor DT. Therefore, the first transistor M1 is turned on by the first scan signal Scan1(*n*) to apply the first reference voltage VREF1 to the gate electrode of the driving transistor DT.

The second transistor M2 transmits the data voltage VDATA to the gate electrode of the driving transistor DT. The second transistor M2 is controlled by the third scan signal Scan3(*n*) and is connected between the data line DL which supplies the data voltage VDATA and the gate electrode of the driving transistor DT. Specifically, a gate electrode of the second transistor M2 may be connected to a third scan line SL3 which supplies a third scan signal Scan3(*n*), a drain electrode of the second transistor M2 may be connected to the data line DL which supplies the data voltage VDATA, and a source electrode of the second transistor M2 may be connected to the gate electrode of the driving transistor DT. Therefore, the second transistor M2 is turned on by the third scan signal Scan3(*n*) to transmit the data voltage VDATA to the gate electrode of the driving transistor DT.

Figure 9:
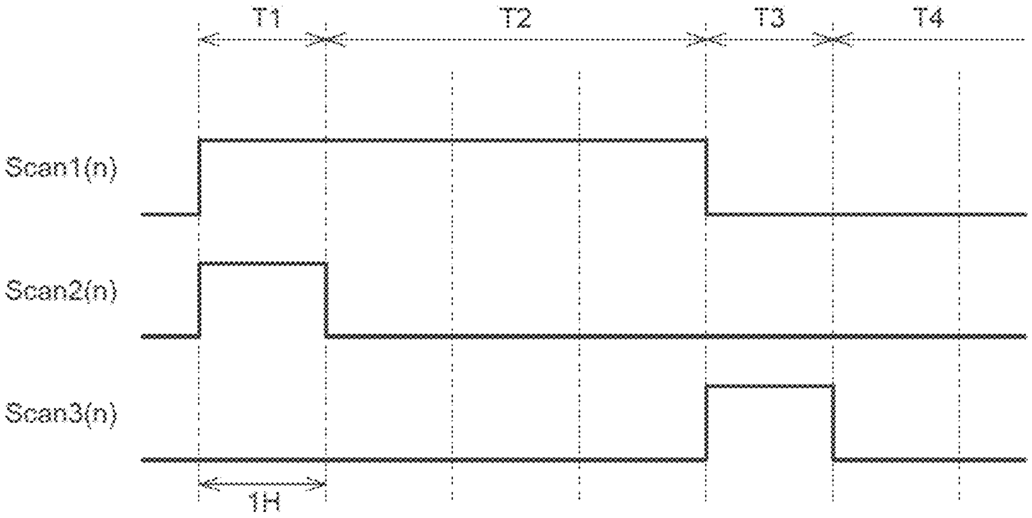
FIG. 9 is a timing chart for explaining the driving of a pixel driving circuit of a display device according to still another exemplary embodiment of the present disclosure.

FIG. 9 is a timing chart for explaining the driving of a pixel driving circuit of a display device according to still another exemplary embodiment of the present disclosure. FIG. 9 is a timing chart of a first scan signal, a second scan signal, and a third scan signal.

Referring to FIG. 9, the pixel driving circuit is driven by a first period T1, a second period T2, a third period T3, and a fourth period T4.

First, the first period T1 in which the light emitting diode ED and the driving transistor DT are initialized may be one horizontal period (1H). During the first period T1, the first scan signal Scan1(*n*) and the second scan signal Scan2(*n*) are applied as gate on voltages and the third scan signal Scan3(*n*) is applied as a gate off voltage.

Next, the second period T2 in which the threshold voltage of the driving transistor DT is sensed may be three horizontal periods (3H). During the second period T2, the first scan signal Scan1(*n*) is applied as a gate on voltage and the second scan signal Scan2(*n*) and the third scan signal Scan3(*n*) are applied as gate off voltages.

Next, a third period T3 in which the data voltage VDATA is input and a mobility of the driving transistor DT is sensed may be one horizontal period 1H. During the third period T3, the third scan signal Scan3(*n*) is applied as a gate on voltage and the first scan signal Scan1(*n*) and the second scan signal Scan2(*n*) are applied as gate off voltages.

Next, the fourth period T4 in which the light emitting diode ED emits light may be two horizontal periods (2H). During the fourth period T4, the first scan signal Scan1(*n*), the second scan signal Scan2(*n*), and the third scan signal Scan3(*n*) are applied as gate off voltages.

Hereinafter, the specific driving of a pixel driving circuit which is disposed in one pixel of a display device according to another exemplary embodiment of the present disclosure will be described in detail with reference to FIGS. 10A to 10H.

Figure 10A:
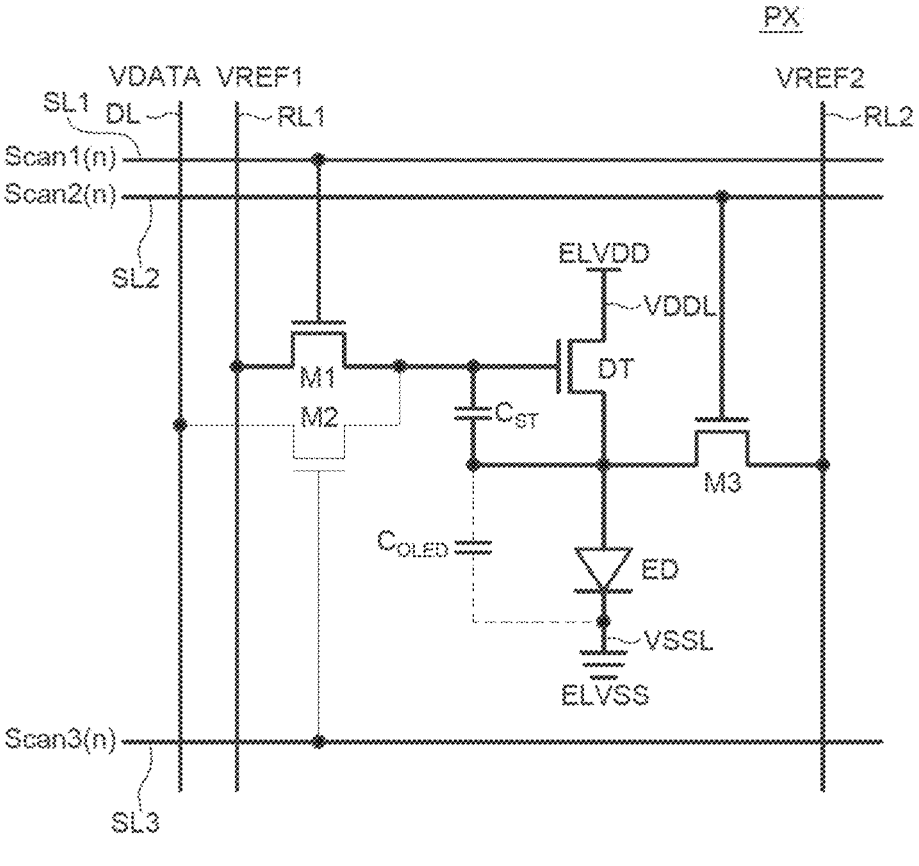
FIGS. 10A to 10H are circuit diagrams and timing charts for explaining a driving period operation of a display device according to still another exemplary embodiment of the present disclosure.
Figure 10B:
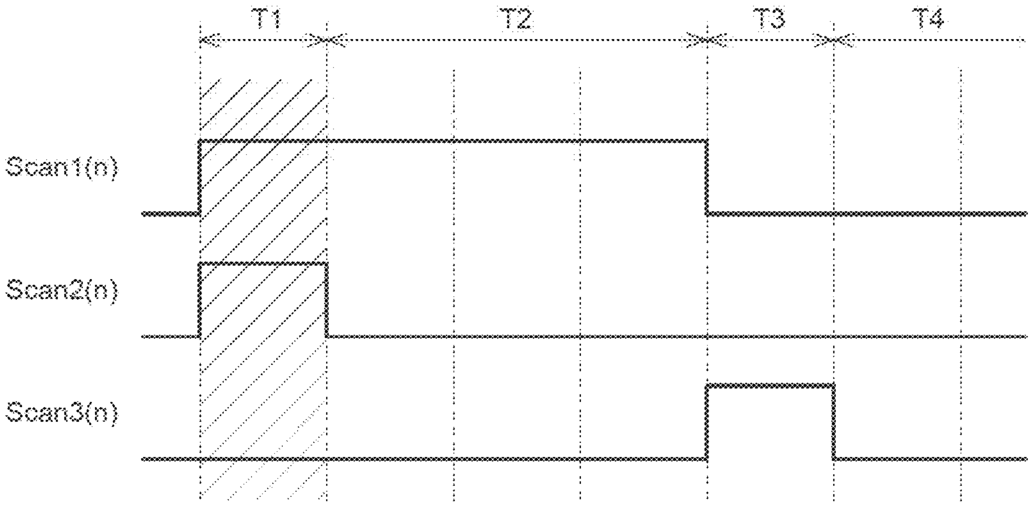
Figure 10C:
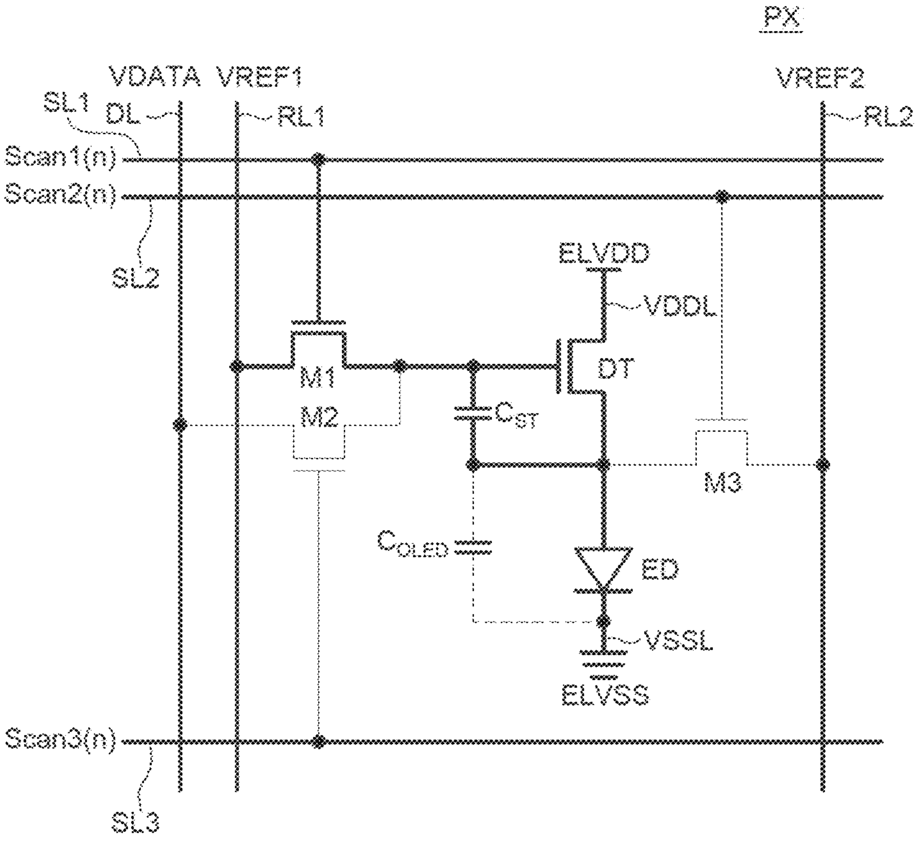
Figure 10D:
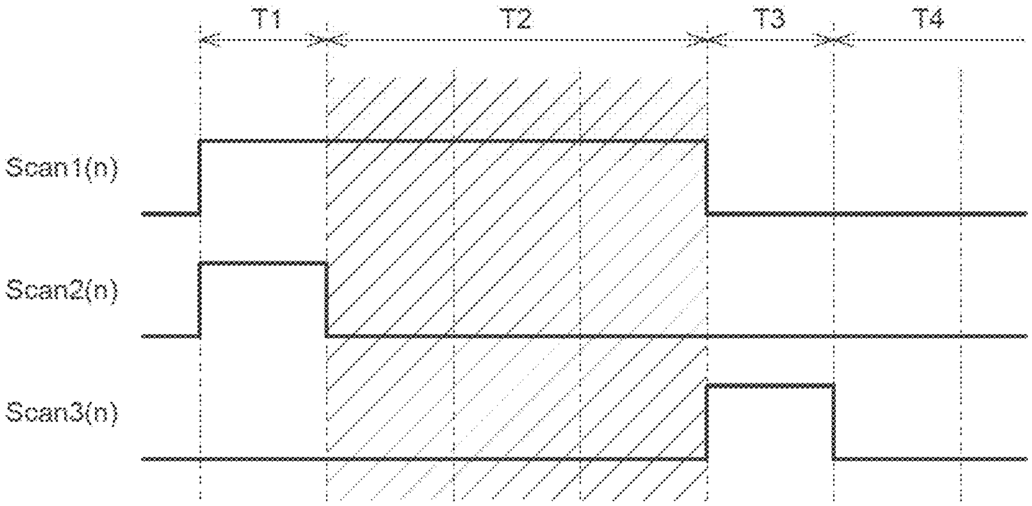
Figure 10E:
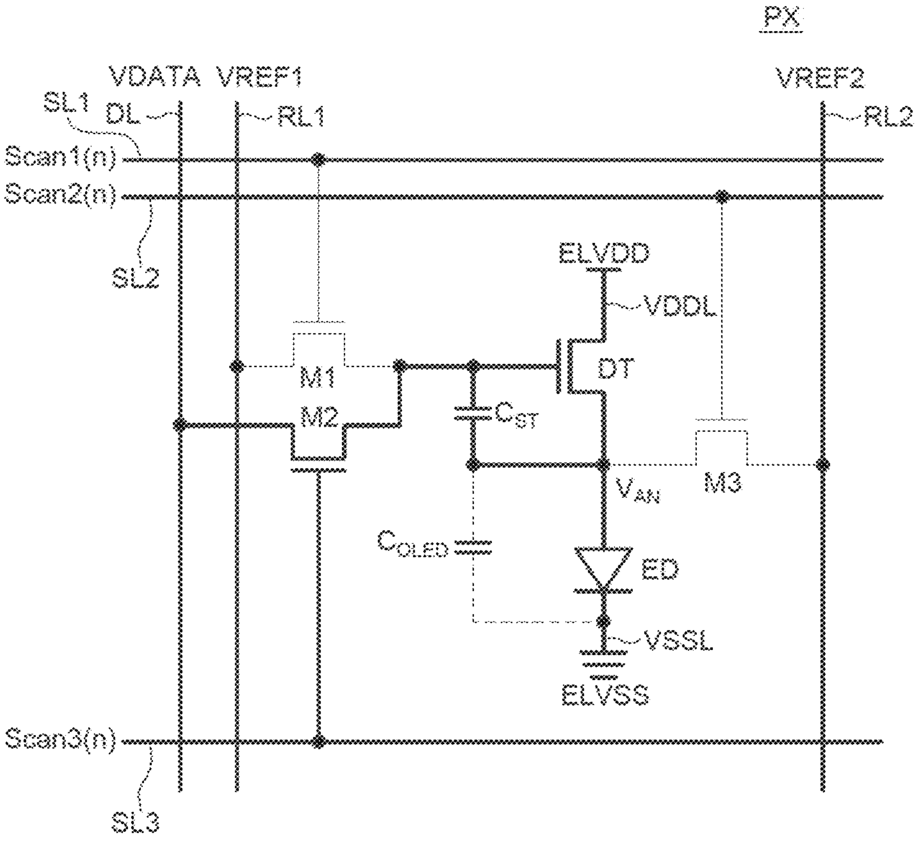
Figure 10F:
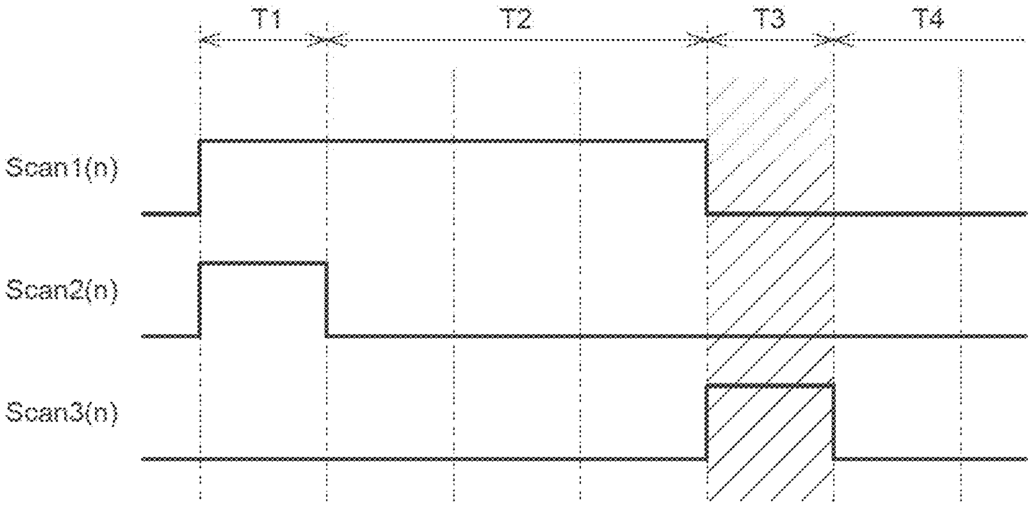
Figure 10G:
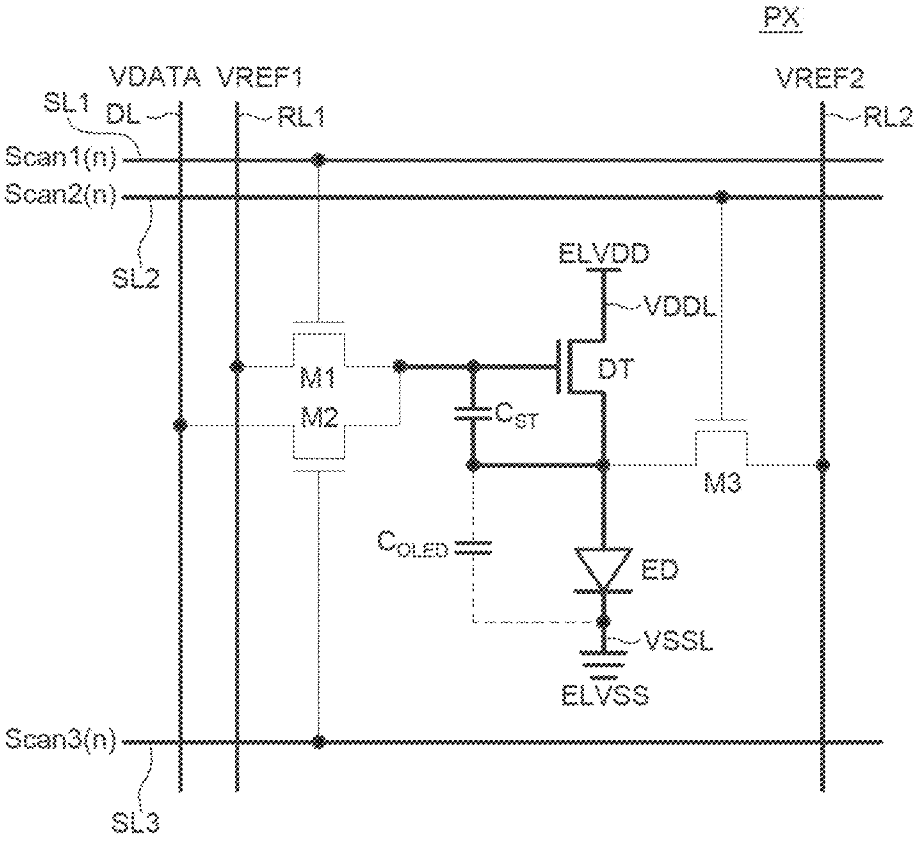

FIGS. 10A to 10H are circuit diagrams and timing charts for explaining a driving period operation of a display device according to another exemplary embodiment of the present disclosure. FIG. 10A is a circuit diagram corresponding to the first period T1 illustrated in FIG. 10B, FIG. 10C is a circuit diagram corresponding to the second period T2 illustrated in FIG. 10D, FIG. 10E is a circuit diagram corresponding to the third period T3 illustrated in FIG. 10F, and FIG. 10G is a circuit diagram corresponding to the fourth period T4 illustrated in FIG. 10H. In FIGS. 10A, 10C, 10E, and 10G, the turned-off transistor is illustrated with a thin solid line and the turned-on transistor is illustrated with a thick solid line.

Specifically, referring to FIGS. 10A and 10B, during the first period T1 in which the light emitting diode ED is initialized, the first scan signal Scan1(*n*) and the second scan signal Scan2(*n*) which are the gate on voltages are applied to the gate electrode of the first transistor M1 and the gate electrode of the third transistor M3, respectively. By doing this, the first transistor M1 and the third transistor M3 are turned on. In contrast, the third scan signal Scan3(*n*) which is the gate off voltage is applied to the gate electrode of the second transistor M2 to turn off the second transistor M2. Therefore, as the third transistor M3 is turned on, the second reference voltage VREF2 is applied to the source electrode of the driving transistor DT and the anode of the light emitting diode ED. Therefore, the gate electrode of the driving transistor DT is initialized by the first reference voltage VREF1 and the anode of the light emitting diode ED and the source electrode of the driving transistor DT are initialized by the second reference voltage VREF2.

Next, referring to FIGS. 10C and 10D, in the second period T2 which senses the threshold voltage of the driving transistor DT, the first scan signal Scan1(*n*) which is the gate on voltage is applied to the gate electrode of the first transistor M1 to maintain a turned-on state of the first transistor M1. In contrast, the second scan signal Scan2(*n*) and the third scan signal Scan3(*n*) which are the gate off voltages are applied to the third transistor M3 and the second transistor M2, respectively, to turn off the third transistor M3 and the second transistor M2. Therefore, as the first transistor M1 is turned on, the first reference voltage VREF1 is applied to the gate electrode of the driving transistor DT. Further, as the third transistor M3 is turned off, the application of the second reference voltage VREF2 is blocked. Therefore, the voltage of the source electrode of the driving transistor DT rises by a source-follower operation. The voltage of the source electrode of the driving transistor DT rises during a predetermined time and the rising degree is gradually reduced, resulting in being saturated to a voltage VREF1-Vth obtained by subtracting the threshold voltage from a first reference voltage VREF1 applied to the gate electrode of the driving transistor DT. Therefore, the voltage sensed in the source electrode of the driving transistor DT may be a voltage VREF1-Vth which is obtained by subtracting the threshold voltage Vth from the first reference voltage VREF1. Therefore, a voltage difference of both ends of the storage capacitor $C_{ST}$ corresponds to the threshold voltage Vth so that the threshold voltage Vth may be stored in the storage capacitor $C_{ST}$ so that the threshold voltage Vth of the driving transistor DT may be compensated. Even though in FIG. 10D, a period in which the threshold voltage of the driving transistor is sensed is three horizontal periods 3H, but is not limited thereto.

Next, referring to FIGS. 10E and 10F, during the third period T3 in which the data voltage VDATA is input and the mobility of the driving transistor DT is sensed, the third scan signal Scan3(*n*) of the gate on voltage is applied to the second transistor M2 to turn on the second transistor M2. In contrast, the first scan signal Scan1(*n*) and the second scan signal Scan2(*n*) which are the gate off voltages are applied to the first transistor M1 and the third transistor 143, respectively, to turn off the first transistor M1 and the third transistor M3. Therefore, as the second transistor M2 is turned on, the data voltage VDATA may be applied to the gate electrode of the driving transistor DT and as the third transistor M3 maintains the turned-off state, the application of the second reference voltage VREF2 is blocked to rise the voltage of the source electrode of the driving transistor DT. At this time, the rising speed of the voltage of the source electrode of the driving transistor DT represents the current capability of the driving transistor DT, that is, the mobility p. Accordingly, the larger the mobility μ of the driving transistor DT, the faster the voltage of the source electrode of the driving transistor DT rises so that the voltage difference $V_{GS}$ of the gate electrode and the source electrode of the driving transistor DT is quickly reduced. Therefore, the rapid increase of the current which flows to the source electrode of the driving transistor DT may be compensated. Further, the smaller the mobility μ of the driving transistor DT, the slower the voltage of the source electrode of the driving transistor DT rises so that the voltage difference $V_{GS}$ of the gate electrode and the source electrode of the driving transistor DT is slowly reduced. Therefore, the slow increase of the current which flows to the source electrode of the driving transistor DT may be compensated. Here, the voltage of the source electrode of the driving transistor DT is equal to the voltage of the anode of the light emitting diode ED and a voltage $V_{AN}$ of the anode of the light emitting diode ED may be derived by the following Equation 5.

$$V_{AN} = \frac{C_{ST}}{C_{ST} + C_{OLED}} V_{Data} + \frac{C_{OLED}}{C_{ST} + C_{OLED}} V_{REF} - V_{TH} \quad \text{[Equation 5]}$$

At this time, $C_{ST}$ may be a capacitance of the storage capacitor $C_{ST}$, $C_{OLED}$ may be a capacitance of the light emitting diode ED, $V_{DATA}$ may be a data voltage VDATA, $V_{REF}$ may be a first reference voltage VREF1, and $V_{TH}$ may be a threshold voltage of the driving transistor.

Figure 10H:
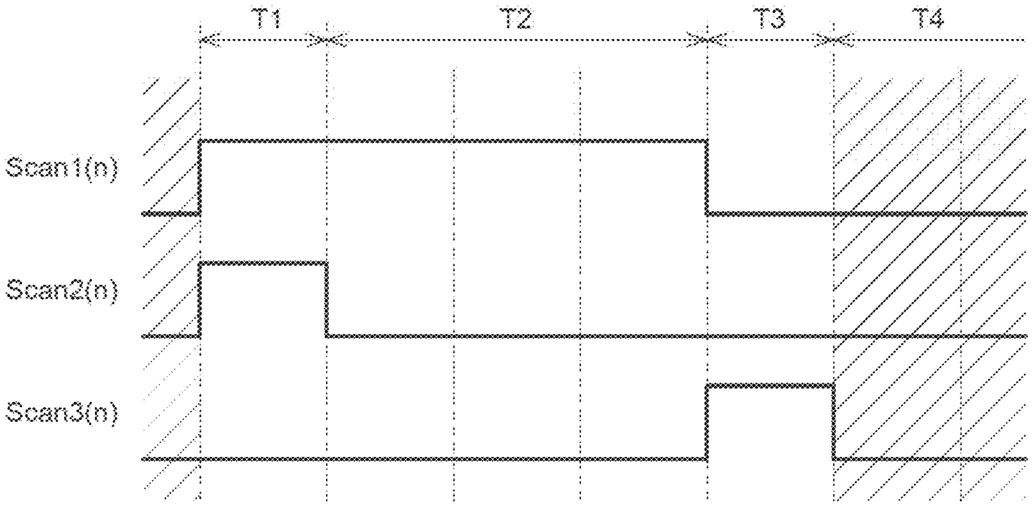

Next, referring to FIGS. 10G and 10H, during the fourth period T4, the first transistor M1, the third transistor M3, and the second transistor M2 to which the first scan signal Scan1(*n*), the second scan signal Scan2(*n*), and the third scan signal Scan3(*n*) of the gate off voltages are applied, respectively, are turned off. Therefore, as the second transistor M2 and the third transistor M3 are turned off, the gate electrode and the source electrode of the driving transistor DT are floated. Therefore, a driving current flows to the light emitting diode ED from the driving transistor DT while maintaining a potential difference between a voltage of the gate electrode of the driving transistor DT and a voltage of the source electrode by a coupling phenomenon of the capacitor to emit light. The driving current flowing from the driving transistor DT to the light emitting diode ED may be derived by the following Equation 6.

$$I_{DT} = \mu_n C_{OX} \frac{W}{L} \left( \frac{C_{OLED}}{C_{ST} + C_{OLED}} (V_{Data} + V_{AN} - V_{ST}) \right)^2 \quad \text{[Equation 6]}$$

At this time, $I_{DT}$ may be a driving current flowing from the driving transistor DT to the light emitting diode ED, $\mu_n$ may be a mobility, $C_{DK}$ may be oxide capacitance, W may be a channel width, L may be a channel length, and $V_{DATA}$ may be a data voltage.

In the display device according to still another exemplary embodiment of the present disclosure, all the threshold voltages and the mobility of the driving transistor DT can be internally compensated. Specifically, the threshold voltages and the mobility of the driving transistor DT are internally compensated without an additional configuration at the outside of the pixel to correspond to the change of the driving transistor DT, thereby improving an image quality. Further, in the display device according to still another exemplary embodiment of the present disclosure, both the positive bias of the threshold voltage of the driving transistor DT and the negative bias of the threshold voltage of the driving transistor DT may be compensated.

Further, in the display device according to still another exemplary embodiment of the present disclosure, an area occupied by the pixel driving circuit may be minimized. That is, in the display device according to another exemplary embodiment of the present disclosure, the pixel driving circuit uses one capacitor to minimize an area of the pixel. Further, in the display device according to still another exemplary embodiment of the present disclosure, the pixel driving circuit may implement the above-described internal compensation and may be implemented with only four transistors.

Further, in the display device according to still another exemplary embodiment of the present disclosure, the data line DL to which the data voltage VDATA is supplied and the reference voltage lines RL1 and RL2 to which the reference voltages VREF1 and VREF2 are supplied are separately disposed to minimize the power consumption. Accordingly, in the display device according to another exemplary embodiment of the present disclosure, the reference voltages VREF1 and VREF2 are fixedly supplied to the reference voltage lines RL1 and RL2 so that power consumption is small. Further, the data line DL is supplied with only the data voltage so that as compared with the example that the reference voltages VREF1 and VREF2 and the data voltage VDATA are alternately supplied, the frequency may be reduced by a half and the power consumption may be reduced.

Figure 11:
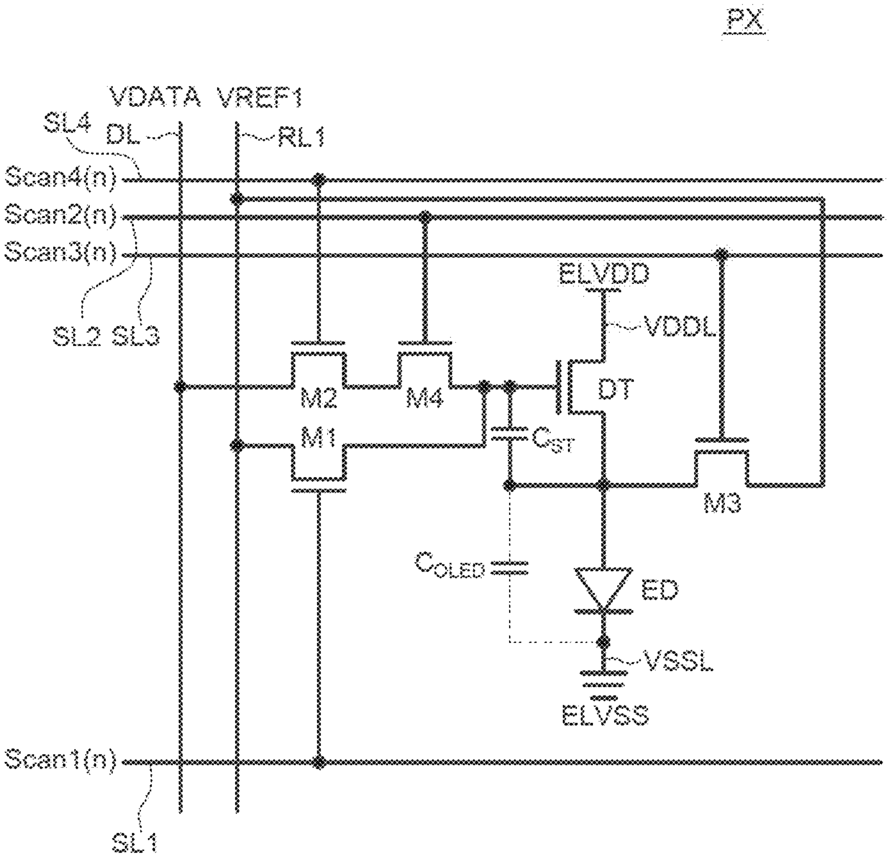
FIG. 11 is a circuit diagram illustrating a pixel driving circuit of a pixel of a display device according to still another exemplary embodiment of the present disclosure.
Figure 12:
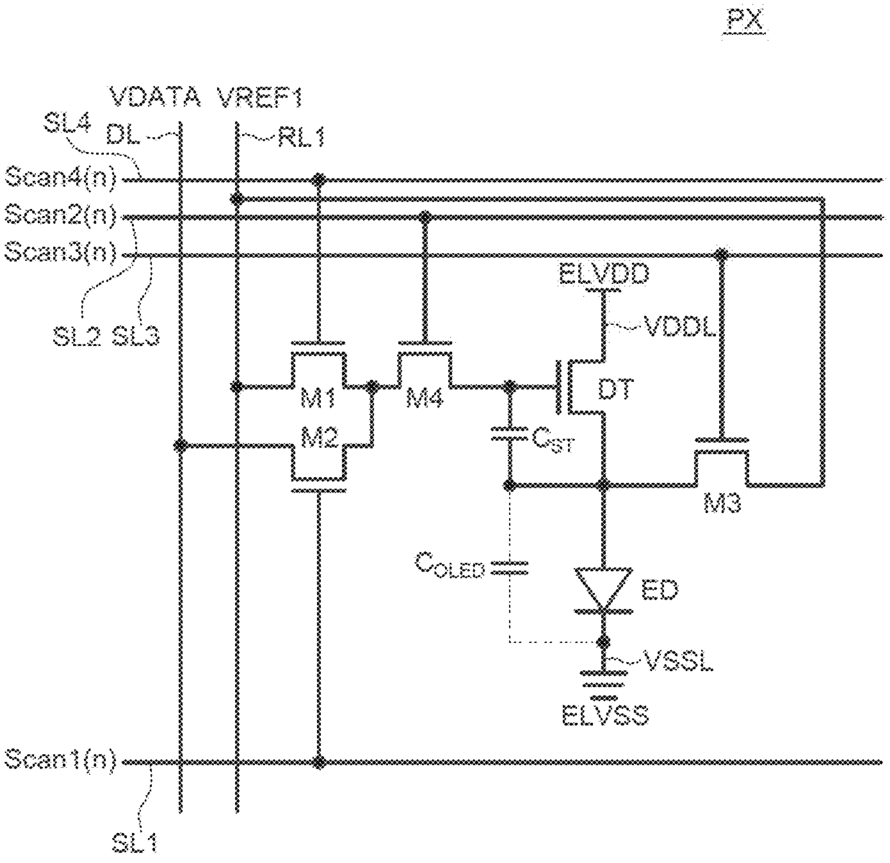
FIG. 12 is a circuit diagram illustrating a pixel driving circuit of a pixel of a display device according to still another exemplary embodiment of the present disclosure.
Figure 13:
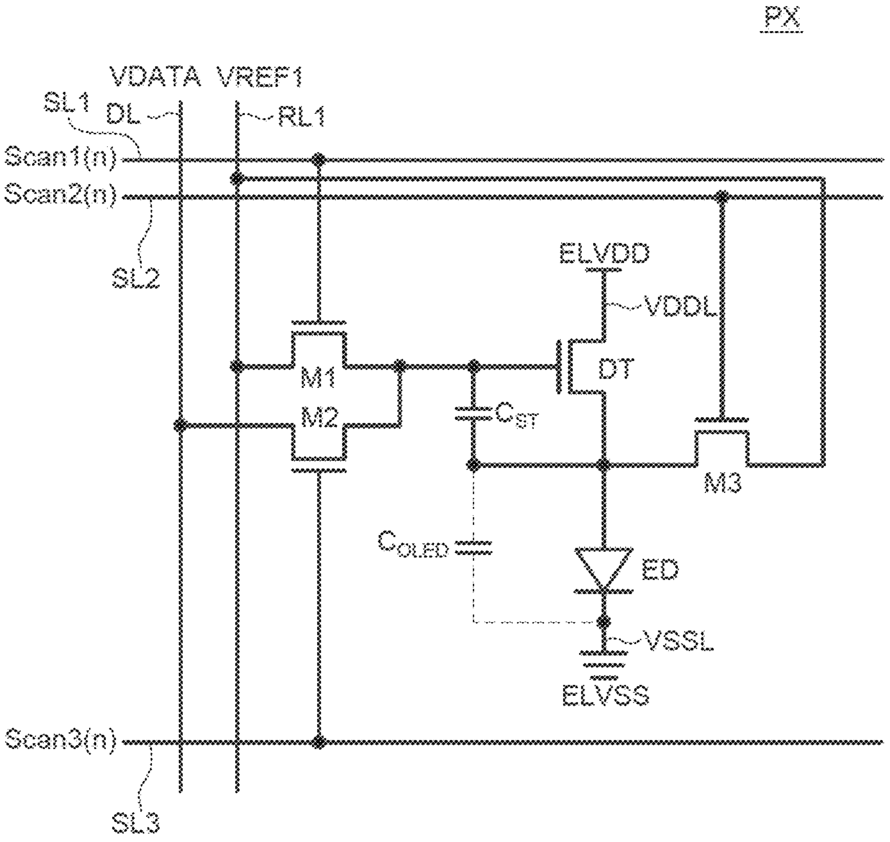
FIG. 13 is a circuit diagram illustrating a pixel driving circuit of a pixel of a display device according to still another exemplary embodiment of the present disclosure.

FIG. 11 is a circuit diagram illustrating a pixel driving circuit of a pixel of a display device according to still another exemplary embodiment of the present disclosure. FIG. 12 is a circuit diagram illustrating a pixel driving circuit of a pixel of a display device according to still another exemplary embodiment of the present disclosure. FIG. 13 is a circuit diagram illustrating a pixel driving circuit of a pixel of a display device according to still another exemplary embodiment of the present disclosure.

Referring to FIG. 11, a pixel driving circuit of FIG. 11 is substantially the same as the pixel driving circuit of FIGS. 2 to 4H except for a reference voltage line RL1 connected to a drain electrode of the third transistor M3 so that a redundant description will be omitted.

Referring to FIG. 11, the first transistor M1 and the third transistor M3 share one reference voltage line RL1. Specifically, the drain electrode of the first transistor M1 is connected to the first reference voltage line RL1 which supplies the first reference voltage VREF1 and the drain electrode of the third transistor M3 is connected to the first reference voltage line RL1 which supplies the first reference voltage VREF1. That is, the first reference voltage VREF1 and the second reference voltage VREF2 which are supplied to the first transistor M1 and the third transistor M3 in the exemplary embodiment of FIG. 2 may be the same as the first reference voltage VREF1 in the exemplary embodiment of FIG. 11. Therefore, when the first transistor M1 is turned on, the first reference voltage VREF1 may be applied to the gate electrode of the driving transistor DT and when the third transistor 143 is turned on, the first reference voltage VREF1 may be applied to the source electrode of the driving transistor DT and the anode of the light emitting diode ED.

Further, in the display device according to still another exemplary embodiment of the present disclosure, an area occupied by the pixel driving circuit may be minimized and an aperture ratio may be increased. Specifically, in the display device according to still another exemplary embodiment of the present disclosure, one reference voltage line is shared to reduce the reference voltage line to one so that the area of the pixel may be minimized and the aperture ratio may be increased.

Referring to FIG. 12, a pixel driving circuit of FIG. 12 is substantially the same as the pixel driving circuit of FIGS. 5 to 7J except for a reference voltage line RL1 connected to a drain electrode of the third transistor M3 so that a redundant description will be omitted.

Referring to FIG. 12, the first transistor M1 and the third transistor M3 share one reference voltage line RL1. Specifically, the drain electrode of the first transistor M1 is connected to the first reference voltage line RL1 which supplies the first reference voltage VREF1 and the drain electrode of the third transistor M3 is also connected to the first reference voltage line RL1 which supplies the first reference voltage VREF1. That is, the first reference voltage VREF1 and the second reference voltage VREF2 which are supplied to the first transistor M1 and the third transistor 143, respectively, in the exemplary embodiment of FIG. 5 may be the same as the first reference voltage VREF1 in the exemplary embodiment of FIG. 12. Therefore, when the first transistor M1 is turned on, the first reference voltage VREF1 may be applied to the drain electrode of the fourth transistor M4 and when the third transistor M3 is turned on, the first reference voltage VREF1 may be applied to the source electrode of the driving transistor DT and the anode of the light emitting diode ED.

Further, in the display device according to still another exemplary embodiment of the present disclosure, an area occupied by the pixel driving circuit may be minimized and an aperture ratio may be increased. Specifically, in the display device according to still another exemplary embodiment of the present disclosure, one reference voltage line is shared to reduce the reference voltage line to one so that the area of the pixel may be minimized and the aperture ratio may be increased.

Referring to FIG. 13, a pixel driving circuit of FIG. 13 is substantially the same as the pixel driving circuit of FIGS. 8 to 10H except for a reference voltage line RL1 connected to a drain electrode of the third transistor M3 so that a redundant description will be omitted.

Referring to FIG. 13, the first transistor M1 and the third transistor M3 share one reference voltage line RL1. Specifically, the drain electrode of the first transistor M1 is connected to the first reference voltage line RL1 which supplies the first reference voltage VREF1 and the drain electrode of the third transistor M3 is connected to the first reference voltage line RL1 which supplies the first reference voltage VREF1. That is, the first reference voltage VREF1 and the second reference voltage VREF2 which are supplied to the first transistor M1 and the third transistor M3, respectively, in the exemplary embodiment of FIG. 8 may be the same as the first reference voltage VREF1 in the exemplary embodiment of FIG. 13. Therefore, when the first transistor M1 is turned on, the first reference voltage VREF1 may be applied to the gate electrode of the driving transistor DT and when the third transistor M3 is turned on, the first reference voltage VREF1 may be applied to the source electrode of the driving transistor DT and the anode of the light emitting diode ED.

Further, in the display device according to still another exemplary embodiment of the present disclosure, an area occupied by the pixel driving circuit may be minimized and an aperture ratio may be increased. Specifically, in the display device according to still another exemplary embodiment of the present disclosure, one reference voltage line is shared to reduce the reference voltage line to one so that the area of the pixel may be minimized and the aperture ratio may be increased.

Figure 14A:
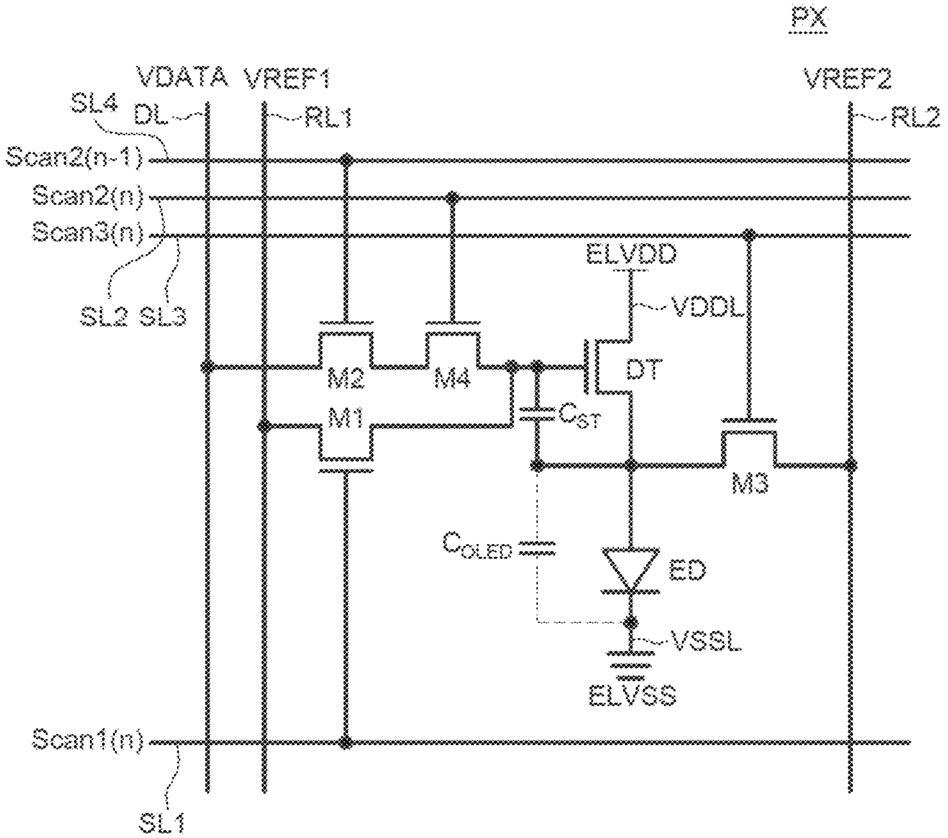
FIGS. 14A and 14B are a circuit diagram and a timing chart for explaining the driving of a pixel driving circuit of a display device according to still another exemplary embodiment of the present disclosure.
Figure 14B:
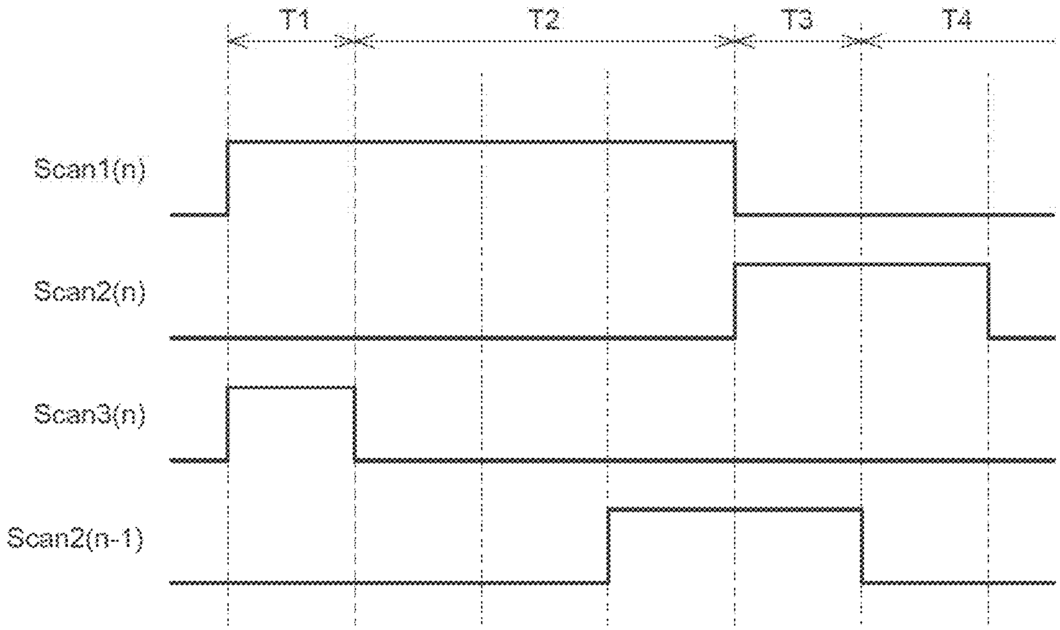

FIGS. 14A and 14B are a circuit diagram and a timing chart for explaining the driving of a pixel driving circuit of a display device according to still another exemplary embodiment of the present disclosure. A pixel driving circuit of FIGS. 14A and 14B is substantially the same as the pixel driving circuit of FIGS. 2 to 4H except for a scan signal which is applied to the gate electrode of the second transistor M2 so that a redundant description will be omitted.

Referring to FIGS. 14A and 14B, a scan signal applied through the fourth scan line SL4 is equal to a second scan signal Scan2($n$−1) which is transmitted to an n−1-th row. That is, the same signal as a second scan signal Scan2($n$−1) supplied to a pixel driving circuit of a pixel PX disposed in an n−1-th row is applied to the gate electrode of a second transistor M2 disposed in an n-th row.

In the display device according to still another exemplary embodiment of the present disclosure, the number of stages of the gate driver may be reduced. That is, the scan signal Scan2($n$−1) which is transmitted to the n−1-th row is applied to the second transistor M2 so that a separate stage which outputs the scan signal applied to the second transistor 142 may be omitted. Accordingly, in the display device according to still another exemplary embodiment of the present disclosure, the number of stages of the gate driver may be reduced so that the configuration of the gate driver may be simplified and an area of the gate driver may be minimized.

Figure 15A:
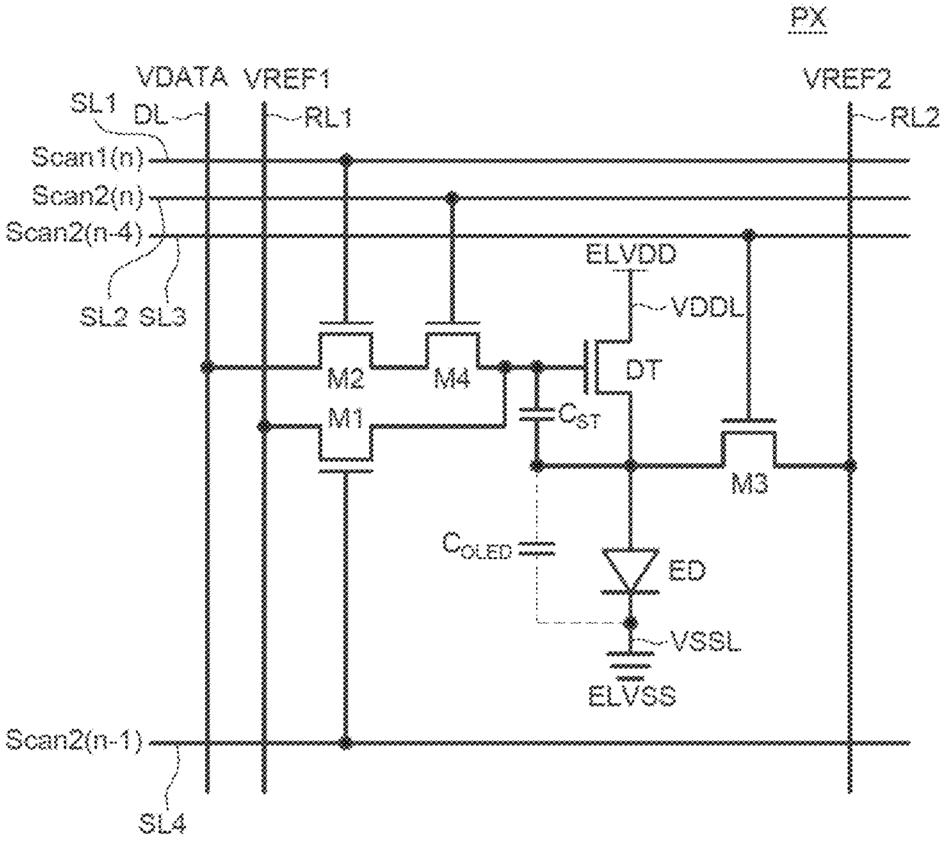
Figure 15B:
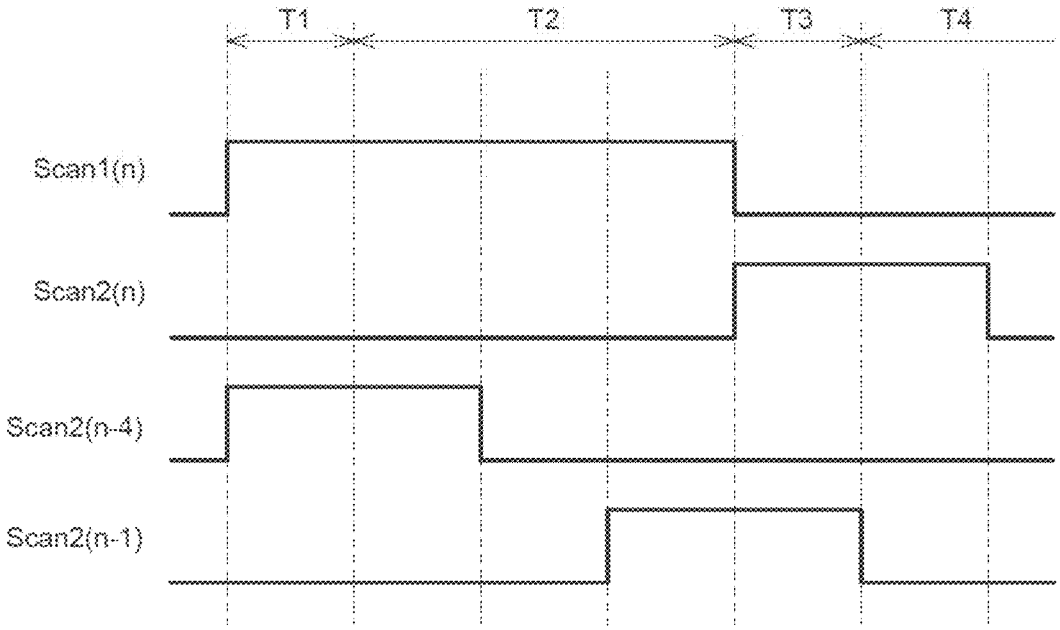

FIGS. 15A and 15B are a circuit diagram and a timing chart for explaining the driving of a pixel driving circuit of a display device according to still another exemplary embodiment of the present disclosure. A pixel driving circuit of FIGS. 15A and 15B is substantially the same as the pixel driving circuit of FIGS. 5 to 7J except for a scan signal which is applied to each of a gate electrode of a second transistor M2 and a gate electrode of a third transistor M3 so that a redundant description will be omitted.

Referring to FIGS. 15A and 15B, a scan signal applied through the third scan line SL3 is equal to a second scan signal Scan2(*n*−4) transmitted to an n−4-th row and a scan signal applied through the fourth scan line SL4 is equal to a second scan signal Scan2(*n*−1) transmitted to an n−1-th row. That is, the same signal as the second scan signal Scan2(*n*−1) applied to a pixel driving circuit of a pixel PX disposed in an n−1-th row is applied to the gate electrode of the second transistor M2 disposed in the n-th row. The same signal as the second scan signal Scan2(*n*−4) applied to a pixel driving circuit of a pixel PX disposed in an n−4-th row is applied to the gate electrode of the third transistor M3 disposed in the n-th row.

In the display device according to still another exemplary embodiment of the present disclosure, the number of stages of the gate driver may be reduced. That is, the second scan signal Scan2(*n*−1) which is transmitted to the n−1-th row is applied to the second transistor M2 and the second scan signal Scan2(*n*−4) which is transmitted to the n−4-th row is applied to the third transistor M3. Therefore, a separate stage which outputs a scan signal applied to the second transistor M2 and the third transistor M3 may be omitted. Accordingly, in the display device according to still another exemplary embodiment of the present disclosure, the number of stages of the gate driver may be reduced so that the configuration of the gate driver may be simplified and an area of the gate driver may be minimized.

Further, in the display device according to still another exemplary embodiment of the present disclosure, all the first scan signal Scan1(*n*), the second scan signal Scan2(*n*), the second scan signal Scan2(*n*−4), and the second scan signal Scan2(*n*−1) are applied for two or more horizontal periods 2H. Therefore, even though a rising time and a falling time are considered, a sufficient time to drive the transistors may be ensured.

Figure 16A:
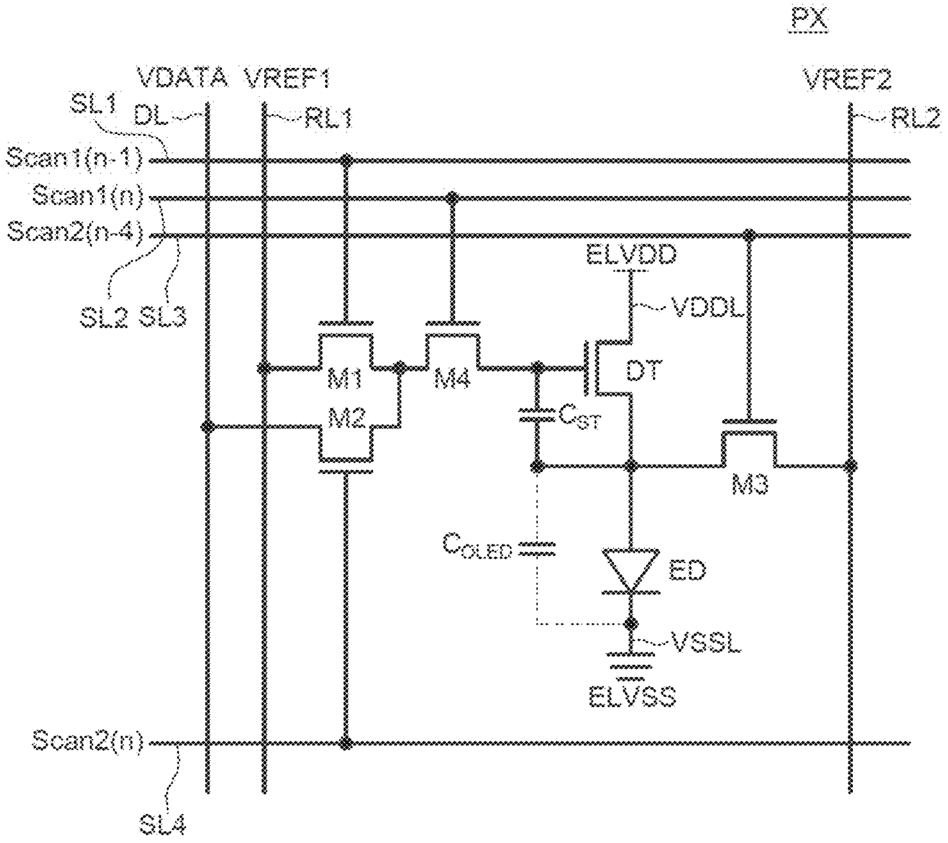
FIGS. 16A and 16B are a circuit diagram and a timing chart for explaining the driving of a pixel driving circuit of a display device according to still another exemplary embodiment of the present disclosure.
Figure 16B:
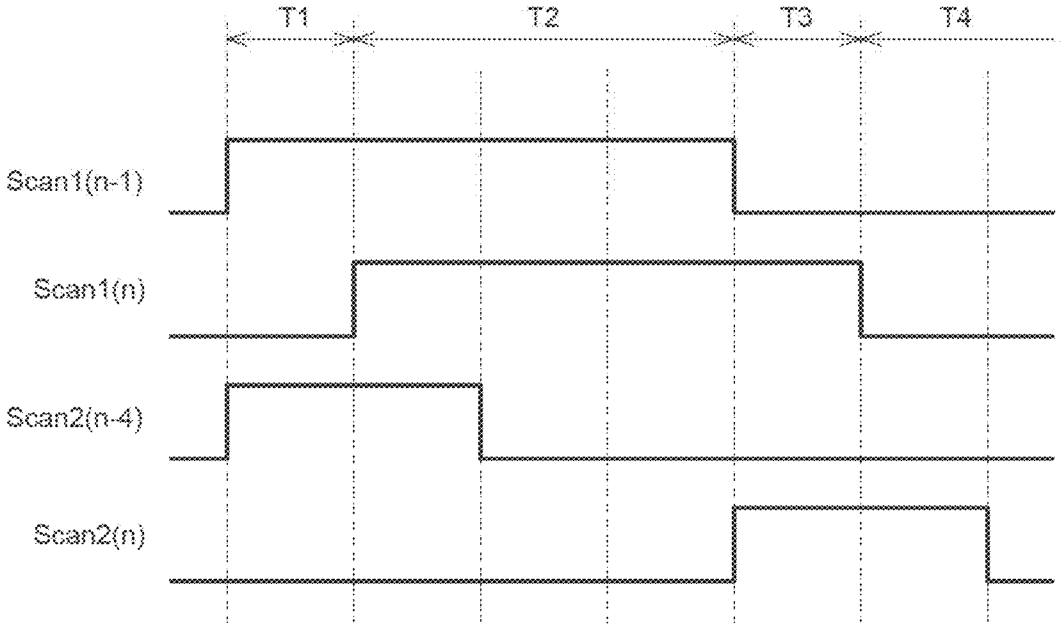

FIGS. 16A and 16B are a circuit diagram and a timing chart for explaining the driving of a pixel driving circuit of a display device according to still another exemplary embodiment of the present disclosure. A pixel driving circuit of FIGS. 16A and 16B is substantially the same as the pixel driving circuit of FIGS. 5 to 7J except for a scan signal which is applied to each of a gate electrode of a first transistor M1 and a gate electrode of a third transistor M3 so that a redundant description will be omitted.

Referring to FIGS. 16A and 16B, a first scan signal Scan1(*n*) is applied through a second scan line SL2 and a second scan signal Scan2(*n*) is applied through a fourth scan line SL4. The scan signal applied through the first scan line SL1 is equal to the first scan signal Scan1(*n*−1) which is transmitted to an n−1-th row and the scan signal applied through the third scan line SL3 is equal to the second scan signal Scan2(*n*−4) which is transmitted to an n−4-th row. That is, the first scan signal Scan1(*n*−1) supplied to a pixel driving circuit of a pixel PX disposed in an n−1-th row is applied to the gate electrode of the first transistor M1 disposed in the n-th row. The second scan signal Scan2(*n*−4) supplied to a pixel driving circuit of a pixel PX disposed in an n−4-th row is applied to the gate electrode of the third transistor M3 disposed in the n-th row.

In the display device according to still another exemplary embodiment of the present disclosure, the number of stages of the gate driver may be reduced. That is, the second scan signal Scan2(*n*−1) which is transmitted to the n−1-th row is applied to the first transistor M1 and the second scan signal Scan2(*n*−4) which is transmitted to the n−4-th row is applied to the third transistor M3. Therefore, a separate stage which outputs a scan signal applied to the first transistor M1 and the third transistor M3 may be omitted. Accordingly, in the display device according to still another exemplary embodiment of the present disclosure, the number of stages of the gate driver may be reduced so that the configuration of the gate driver may be simplified and an area of the gate driver may be minimized.

Figure 17A:
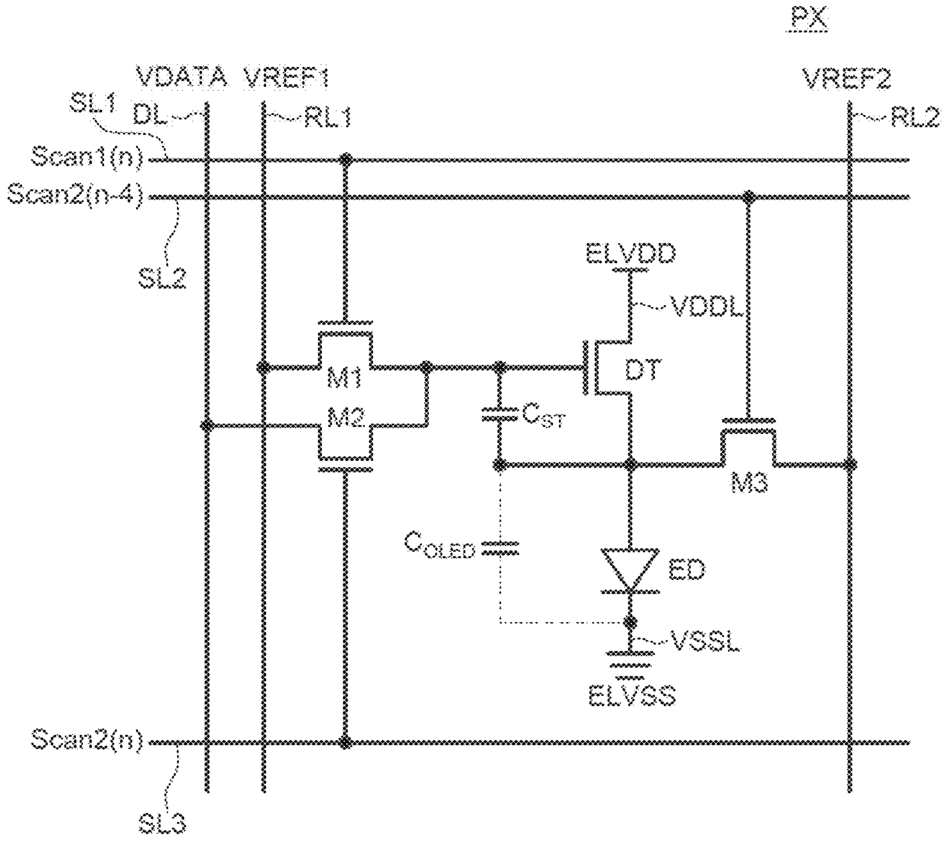
FIGS. 17A and 17B are a circuit diagram and a timing chart for explaining the driving of a pixel driving circuit of a display device according to still another exemplary embodiment of the present disclosure.
Figure 17B:
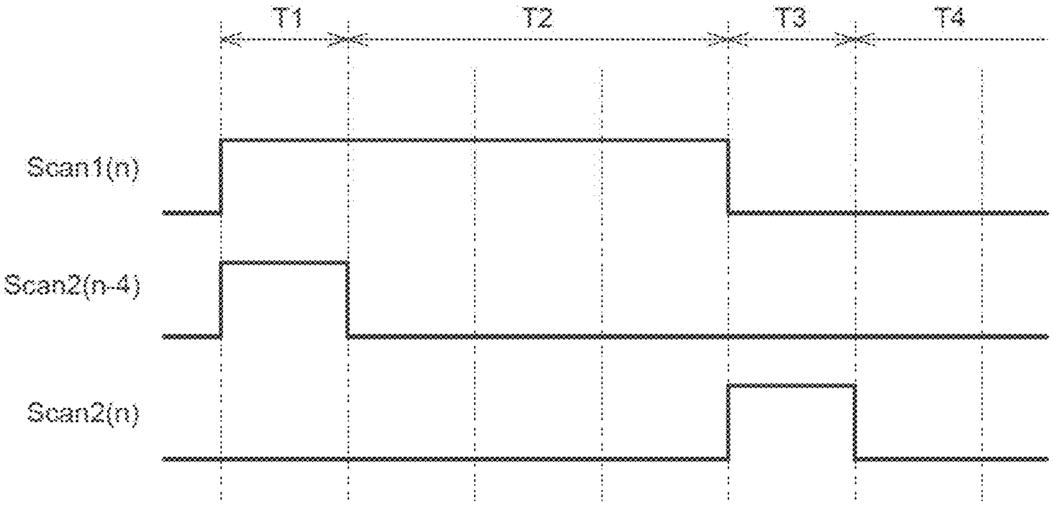

FIGS. 17A and 17B are a circuit diagram and a timing chart for explaining the driving of a pixel driving circuit of a display device according to still another exemplary embodiment of the present disclosure. A pixel driving circuit of FIGS. 17A and 17B is substantially the same as the pixel driving circuit of FIGS. 8 to 10H except for a scan signal which is applied to each of the gate electrode of a second transistor M2 and a gate electrode of a third transistor M3 so that a redundant description will be omitted.

Referring to FIGS. 17A and 17B, the second scan signal Scan2(*n*) is applied through the third scan line SL3 and the scan signal applied through the second scan line SL2 is equal to the second scan signal Scan2(*n*−4) transmitted to the n−4-th row. That is, the second scan signal Scan2(*n*) is applied to the gate electrode of the second transistor M2 disposed in the n-th row and the second scan signal Scan2 (*n*−4) supplied to the pixel driving circuit of the pixel PX disposed in the n−4-th row is applied to the gate electrode of the third transistor M3 disposed in the n-th row.

In the display device according to still another exemplary embodiment of the present disclosure, the number of stages of the gate driver may be reduced. That is, the scan signal Scan2(*n*−4) which is transmitted to the n−4-th row is applied to the third transistor M3 so that a separate stage which outputs the scan signal applied to the third transistor M3 may be omitted. Accordingly, in the display device according to still another exemplary embodiment of the present disclosure, the number of stages of the gate driver may be reduced so that the configuration of the gate driver may be simplified and an area of the gate driver may be minimized.

The exemplary embodiments of the present disclosure can also be described as follows:

According to an aspect of the present disclosure, there is provided a display device. The display device includes a light emitting diode and a pixel driving circuit which drives the light emitting diode, wherein the pixel driving circuit includes a driving transistor which applies a driving current to the light emitting diode, a first transistor which applies a first reference voltage to a gate electrode of the driving transistor, a second transistor which applies a data voltage to the gate electrode of the driving transistor, a third transistor which applies a second reference voltage to a source electrode of the driving transistor and a storage capacitor connected to the gate electrode and the source electrode of the driving transistor.

The pixel driving circuit further may include a fourth transistor which is connected between the second transistor and the driving transistor to transmit the data voltage to the gate electrode of the driving transistor.

The first transistor may be controlled by a first scan signal and is connected between a first reference voltage line which supplies the first reference voltage and the gate electrode of the driving transistor, the second transistor is controlled by a fourth scan signal and is connected between a data line which supplied the data voltage and the fourth transistor, the third transistor is controlled by a third scan signal and is connected between a second reference voltage line which supplies the second reference voltage and the source electrode of the driving transistor, and the fourth transistor is controlled by a second scan signal and is connected between the second transistor and the gate electrode of the driving transistor.

The pixel driving circuit may be disposed in an n-th row and the fourth scan signal is equal to a second scan signal which is transmitted to a n−1-th row.

In a first period in which the light emitting diode and the driving transistor are initialized, the first scan signal and the third scan signal may be gate on voltages and the second scan signal and the fourth scan signal may be gate off voltages, in a second period in which a threshold voltage of the driving transistor is sensed, a part of the first scan signal and the fourth scan signal may be gate on voltage and the second scan signal and the third scan signal are gate off voltages, in a third period in which the data voltage is applied and a mobility of the driving transistor is sensed, the second scan signal and the fourth scan signal may be gate on voltages and the first scan signal and the third scan signal may be gate off voltages, and in a fourth period in which the light emitting diode emits light, a part of the second scan signal may be gate on voltage and the first scan signal, the third scan signal, and the fourth scan signal may be gate off voltages.

The first transistor may be controlled by a first scan signal and is connected between a first reference voltage line which supplies the first reference voltage and the fourth transistor, the second transistor is controlled by a fourth scan signal and is connected between a data line which supplies the data voltage and the fourth transistor, the third transistor is controlled by a third scan signal and is connected between a second reference voltage line which supplies the second reference voltage and the source electrode of the driving transistor, and the fourth transistor is controlled by a second scan signal and is connected between the second transistor and the gate electrode of the driving transistor.

The pixel driving circuit may be disposed in an n-th row, the third scan signal is equal to a second scan signal which is transmitted to an n−4-th row, and the fourth scan signal is equal to a second scan signal transmitted to an n−1-th row.

The pixel driving circuit may be disposed in an n-th row, the first scan signal is equal to a second scan signal which is transmitted to an n−1-th row, and the third scan signal is equal to a second scan signal transmitted to an n−4-th row.

In a first period in which the light emitting diode is initialized, the first scan signal and the third scan signal may be gate on voltages and the second scan signal and the fourth scan signal may be gate off voltages, in a second period in which the driving transistor is initialized, the first scan signal, the second scan signal, and the third scan signal may be gate on voltages and the fourth scan signal may be gate off voltage, in a third period in which a threshold voltage of the driving transistor is sensed, the first scan signal and the second scan signal may be gate on voltages and the third scan signal and the fourth scan signal may be gate off voltages, in a fourth period in which the data voltage is applied and a mobility of the driving transistor is sensed, the second scan signal and the fourth scan signal may be gate on voltages and the first scan signal and the third scan signal may be gate off voltages, and in a fifth period in which the light emitting diode emits light, a part of the fourth scan signal may be gate on voltage and the first scan signal, the second scan signal, and the third scan signal may be gate off voltages.

The first transistor may be controlled by a first scan signal and is connected between a first reference voltage line which supplies the first reference voltage and the gate electrode of the driving transistor, the second transistor may be controlled by a third scan signal and is connected between a data line which supplied the data voltage and the gate electrode of the driving transistor, and the third transistor may be controlled by a second scan signal and is connected between a second reference voltage line which supplies the second reference voltage and the source electrode of the driving transistor.

The pixel driving circuit may be disposed in an n-th row, the second scan signal is equal to a second scan signal which is transmitted to an n−4-th row, and the third scan signal is equal to a second scan signal transmitted to an n-th row.

In a first period in which the light emitting diode and the driving transistor are initialized, the first scan signal and the second scan signal may be gate on voltages and the third scan signal may be gate off voltage, in a second period in which a threshold voltage of the driving transistor is sensed, the first scan signal may be gate on voltage and the second scan signal and the third scan signal may be gate off voltages, in a third period in which the data voltage is applied and a mobility of the driving transistor is sensed, the third scan signal may be gate on voltage and the first scan signal and the second scan signal may be gate off voltages, and in a fourth period in which the light emitting diode emits light, the first scan signal, the second scan signal, and the third scan signal may be gate off voltages.

The first reference voltage and the second reference voltage may be the same voltage and the first transistor and the third transistor may be connected to the same reference voltage line.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:

a light emitting diode; and a pixel driving circuit for driving the light emitting diode, wherein the pixel driving circuit includes:

a driving transistor for applying a driving current to the light emitting diode;

a first transistor for applying a first reference voltage to a gate electrode of the driving transistor;

a second transistor for applying a data voltage to the gate electrode of the driving transistor;

a third transistor for applying a second reference voltage to a source electrode of the driving transistor;

a fourth transistor which is connected between the second transistor and the driving transistor to transmit the data voltage to the gate electrode of the driving transistor; and a storage capacitor connected to the gate electrode and the source electrode of the driving transistor, wherein the first transistor, the second transistor and the fourth transistor are controlled by different scan signals, wherein the first transistor is for being controlled by a first scan signal and is connected between a first reference voltage line for supplying the first reference voltage and the gate electrode of the driving transistor, the second transistor is for being controlled by a fourth scan signal and is connected between a data line for supplying the data voltage and the fourth transistor, the third transistor is for being controlled by a third scan signal and is connected between a second reference voltage line for supplying the second reference voltage and the source electrode of the driving transistor, and the fourth transistor is for being controlled by a second scan signal and is connected between the second transistor and the gate electrode of the driving transistor, and wherein in a first period in which the light emitting diode and the driving transistor are initialized, the first scan signal and the third scan signal are gate on voltages and the second scan signal and the fourth scan signal are gate off voltages, in a second period in which a threshold voltage of the driving transistor is sensed, a part of the first scan signal and the fourth scan signal is a gate on voltage and the second scan signal and the third scan signal are gate off voltages, in a third period in which the data voltage is applied and a mobility of the driving transistor is sensed, the second scan signal and the fourth scan signal are gate on voltages and the first scan signal and the third scan signal are gate off voltages, and in a fourth period in which the light emitting diode emits light, a part of the second scan signal is a gate on voltage and the first scan signal, the third scan signal, and the fourth scan signal are gate off voltages.

2. The display device according to claim 1, wherein the pixel driving circuit is disposed in a n-th row and a fourth scan signal which is for being transmitted to the n-th row is equal to a second scan signal which is for being transmitted to a n−1-th row, wherein n is an integer.

3. The display device according to claim 1, wherein the first reference voltage and the second reference voltage are the same voltage and the first transistor and the third transistor are connected to the same reference voltage line.

4. The display device according to claim 1, wherein the first transistor is for being controlled by a fourth scan signal and is connected between a first reference voltage line for supplying the first reference voltage and the gate electrode of the driving transistor, the second transistor is for being controlled by a first scan signal and is connected between a data line for supplying the data voltage and the fourth transistor, the third transistor is for being controlled by a third scan signal and is connected between a first reference voltage line for supplying the first reference voltage and the source electrode of the driving transistor, and the fourth transistor is for being controlled by a second scan signal and is connected between the second transistor and the gate electrode of the driving transistor.

5. The display device according to claim 1, wherein the first transistor is for being controlled by a second scan signal and is connected between a first reference voltage line for supplying the first reference voltage and the gate electrode of the driving transistor, the second transistor is for being controlled by a first scan signal and is connected between a data line for supplying the data voltage and the fourth transistor, the third transistor is for being controlled by a second scan signal and is connected between a second reference voltage line for supplying the second reference voltage and the source electrode of the driving transistor, and the fourth transistor is for being controlled by a second scan signal and is connected between the second transistor and the gate electrode of the driving transistor.

6. A display device, comprising:

a light emitting diode; and a pixel driving circuit for driving the light emitting diode, wherein the pixel driving circuit includes:

a driving transistor for applying a driving current to the light emitting diode;

a first transistor for applying a first reference voltage to a gate electrode of the driving transistor;

a second transistor for applying a data voltage to the gate electrode of the driving transistor;

a third transistor for applying a second reference voltage to a source electrode of the driving transistor;

a fourth transistor which is connected between the second transistor and the driving transistor to transmit the data voltage to the gate electrode of the driving transistor; and a storage capacitor connected to the gate electrode and the source electrode of the driving transistor, wherein the first transistor, the second transistor and the fourth transistor are controlled by different scan signals, wherein the first transistor is for being controlled by a first scan signal and is connected between a first reference voltage line for supplying the first reference voltage and the fourth transistor, the second transistor is for being controlled by a fourth scan signal and is connected between a data line for supplying the data voltage and the fourth transistor, the third transistor is for being controlled by a third scan signal and is connected between a second reference voltage line for supplying the second reference voltage and the source electrode of the driving transistor, and the fourth transistor is for being controlled by a second scan signal and is connected between the second transistor and the gate electrode of the driving transistor, and wherein in a first period in which the light emitting diode is initialized, the first scan signal and the third scan signal are gate on voltages and the second scan signal and the fourth scan signal are gate off voltages, in a second period in which the driving transistor is initialized, the first scan signal, the second scan signal, and the third scan signal are gate on voltages and the fourth scan signal is a gate off voltage, in a third period in which a threshold voltage of the driving transistor is sensed, the first scan signal and the second scan signal are gate on voltages and the third scan signal and the fourth scan signal are gate off voltages, in a fourth period in which the data voltage is applied and a mobility of the driving transistor is sensed, the second scan signal and the fourth scan signal are gate on voltages and the first scan signal and the third scan signal are gate off voltages, and in a fifth period in which the light emitting diode emits light, a part of the fourth scan signal is a gate on voltage and the first scan signal, the second scan signal, and the third scan signal are gate off voltages.

7. The display device according to claim 6, wherein the pixel driving circuit is disposed in a n-th row, a third scan signal which is for being transmitted to the n-th row is equal to a second scan signal which is for being transmitted to an n−4-th row, and a fourth scan signal which is for being transmitted to the n-th row is equal to a second scan signal for being transmitted to an n−1-th row, wherein n is an integer.

8. The display device according to claim 6, wherein the pixel driving circuit is disposed in a n-th row, a first scan signal which is for being transmitted to the n-th row is equal to a second scan signal which is for being transmitted to an n−1-th row, and a third scan signal which is for being transmitted to the n-th row is equal to a second scan signal for being transmitted to an n−4-th row, wherein n is an integer.

9. A display device, comprising:

a light emitting diode; and a pixel driving circuit for driving the light emitting diode, wherein the pixel driving circuit includes:

a driving transistor for applying a driving current to the light emitting diode;

a first transistor for applying a first reference voltage to a gate electrode of the driving transistor;

a second transistor for applying a data voltage to the gate electrode of the driving transistor; and a third transistor for applying a second reference voltage to a source electrode of the driving transistor, wherein the first transistor is for being controlled by a first scan signal and is connected between a first reference voltage line for supplying the first reference voltage and the gate electrode of the driving transistor, the second transistor is for being controlled by a third scan signal and is connected between a data line for supplying the data voltage and the gate electrode of the driving transistor, and the third transistor is for being controlled by a second scan signal and is connected between a second reference voltage line for supplying the second reference voltage and the source electrode of the driving transistor, and wherein the pixel driving circuit is disposed in a n-th row, a second scan signal which is for being transmitted to the n-th row is equal to a second scan signal which is for being transmitted to an n−4-th row, and a third scan signal which is for being transmitted to the n-th row is equal to a second scan signal for being transmitted to an n-th row, wherein n is an integer.

10. The display device according to claim 9, wherein in a first period in which the light emitting diode and the driving transistor are initialized, the first scan signal and the second scan signal are gate on voltages and the third scan signal is a gate off voltage, in a second period in which a threshold voltage of the driving transistor is sensed, the first scan signal is a gate on voltage and the second scan signal and the third scan signal are gate off voltages, in a third period in which the data voltage is applied and a mobility of the driving transistor is sensed, the third scan signal is a gate on voltage and the first scan signal and the second scan signal are gate off voltages, and in a fourth period in which the light emitting diode emits light, the first scan signal, the second scan signal, and the third scan signal are gate off voltages.

11. A method for the pixel driving circuit of the display device according to claim 9, comprising:

in a first period in which the light emitting diode and the driving transistor are initialized, applying the first scan signal and the second scan signal, which are gate on voltages, to the gate electrode of the first transistor and the gate electrode of the third transistor, and applying the third scan signal, which is gate off voltage, to the gate electrode of the second transistor;

in a second period in which a threshold voltage of the driving transistor is sensed, applying the first scan signal, which is gate on voltage, to the gate electrode of the first transistor, and applying the third scan signal and the second scan signal, which are gate off voltages, to the gate electrode of the second transistor and the gate electrode of the third transistor;

in a third period in which the data voltage is applied and a mobility of the driving transistor is sensed, applying the third scan signal, which is gate on voltage, to the gate electrode of the second transistor, and applying the first scan signal and the second scan signal, which are gate off voltages, to the gate electrode of the first transistor and the gate electrode of the third transistor; and in a fourth period in which the light emitting diode emits light, applying the first scan signal, the third scan signal and the second scan signal, which are gate off voltages, to the gate electrode of the first transistor, the gate electrode of the second transistor and the gate electrode of the third transistor.

* * * * *